US012315428B2

(12) United States Patent
Noh et al.

(10) Patent No.: US 12,315,428 B2
(45) Date of Patent: May 27, 2025

(54) DISPLAY DEVICE

(71) Applicant: LG Display Co., Ltd., Seoul (KR)

(72) Inventors: Suncheol Noh, Paju-si (KR); Taegung Kim, Paju-si (KR); Junwoo Yun, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/542,257

(22) Filed: Dec. 15, 2023

(65) Prior Publication Data

US 2024/0249662 A1 Jul. 25, 2024

(30) Foreign Application Priority Data

Jan. 20, 2023 (KR) ........................ 10-2023-0008777

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0819* (2013.01); *G09G 2300/0842* (2013.01); *G09G 2310/08* (2013.01); *G09G 2320/0233* (2013.01); *G09G 2320/0247* (2013.01); *G09G 2320/0626* (2013.01); *G09G 2340/0435* (2013.01)

(58) Field of Classification Search
None
See application file for complete search history.

(56) References Cited

U.S. PATENT DOCUMENTS

2004/0218134 A1* 11/2004 Kojima ................ G09G 3/3611 349/155
2009/0115773 A1* 5/2009 Wu ...................... G09G 3/3611 345/214
2010/0039416 A1* 2/2010 Shin ......................... G09G 3/20 345/208
2019/0035366 A1* 1/2019 Li ........................ G09G 3/3648
2019/0180695 A1* 6/2019 Ha ....................... G09G 3/2051
(Continued)

FOREIGN PATENT DOCUMENTS

KR 10-2008-0049543 A 6/2008

OTHER PUBLICATIONS

Intellectual Property Office of the United Kingdom, Combined Search and Examination Report, GB2320134.6, Jun. 27, 2024, seven pages.

*Primary Examiner* — Dorothy Harris
(74) *Attorney, Agent, or Firm* — Fenwick & West LLP

(57) ABSTRACT

A display device includes a display panel including a plurality of pixels, the plurality of pixels driven during a first frame with a first driving frequency and a second frame with a second driving frequency, a frequency generation unit configured to generate first frequency information indicative of the first driving frequency of the first frame after an end of the first frame, a gain generation unit configured to receive the first frequency information indicative of the first driving frequency generated by the frequency generation unit and generate a first gain value for the second frame based on the first driving frequency of the first frame indicated in the received first frequency information, and a video data output unit configured to output video data generated based on the first gain value to a data driving unit during the second frame.

21 Claims, 22 Drawing Sheets

(56) References Cited

U.S. PATENT DOCUMENTS

| | | | | |
|---|---|---|---|---|
| 2022/0199025 | A1* | 6/2022 | Hong | G09G 3/3258 |
| 2023/0129090 | A1* | 4/2023 | Kim | G09G 3/3275 345/690 |

* cited by examiner

DISPLAY DEVICE

CROSS REFERENCE TO RELATED APPLICATION

The present application claims priority to the Republic of Korea Patent Application No. 10-2023-0008777, filed on Jan. 20, 2023, which is incorporated by reference in its entirety.

BACKGROUND

Field of Technology

The present invention relates to a display device.

Description of the Related Art

With the advancement of the information society, there is an increasing demand for display devices that can show images, and various types of display devices such as liquid crystal display (LCD) devices and organic light emitting diode (OLED) displays are being utilized.

The images displayed on the display device can be still images or videos, encompassing various types such as sports videos, game videos, and movies. To reduce power consumption and extend the lifespan of the display device, it can be operated in a Variable Refresh Rate (VRR) mode in which the driving frequency varies depending on the type of image.

In such a display device, when there is practically no change in the input video, the pixels can be operated at a low frequency (e.g., low-speed operation) by reducing the refresh rate. However, when the pixels are operated at a low frequency, luminance differences occur between pixels due to voltage discharge, which can cause image distortion or flickering, resulting in a degradation of image quality.

SUMMARY

Embodiments provide display devices capable of preventing flickering during low-speed operation.

In addition, embodiments provide display devices capable of improving luminance differences caused by different driving frequencies.

In one embodiment, a display device comprises: a display panel including a plurality of pixels, the plurality of pixels driven during a first frame with a first driving frequency and driven during a second frame with a second driving frequency; a frequency generation circuit configured to generate first frequency information indicative of the first driving frequency of the first frame after an end of the first frame; a gain generation circuit configured to receive the first frequency information indicative of the first driving frequency generated by the frequency generation circuit and generate a first gain value for the second frame based on the first driving frequency of the first frame indicated in the received first frequency information; and a video data output circuit configured to output video data generated based on the first gain value to a data driving circuit during the second frame, wherein the display panel displays an image based on the outputted video data during the second frame.

In one embodiment, a display device comprises: a display panel including a plurality of pixels, a plurality of data lines, and a plurality of gate lines that intersect the plurality of data lines, the plurality of pixels driven during a first frame with a first driving frequency and the plurality of pixels driven during a second frame with a second driving frequency; a timing controller configured to generate a first gain value for the second frame based on the first driving frequency of the first frame and output first video data that is generated based on the first gain value during the second frame; a data driver configured to convert the first video data generated based on the first gain value into first data signals that are transmitted to the plurality of data lines during the second frame; and a gate driver configured to output gate signals to the plurality of data lines during the first frame and the second frame, wherein the display panel displays an image based on the first data signals during the second frame.

The detailed descriptions of other embodiments are included in the specifications and drawings.

For example, the video data output unit may decrease the second voltage level in a stepwise manner based on the counted duration of the second blank period.

Display devices according to embodiments are capable of improving luminance differences caused by different driving frequencies.

DETAILED DESCRIPTION

Figure 1:
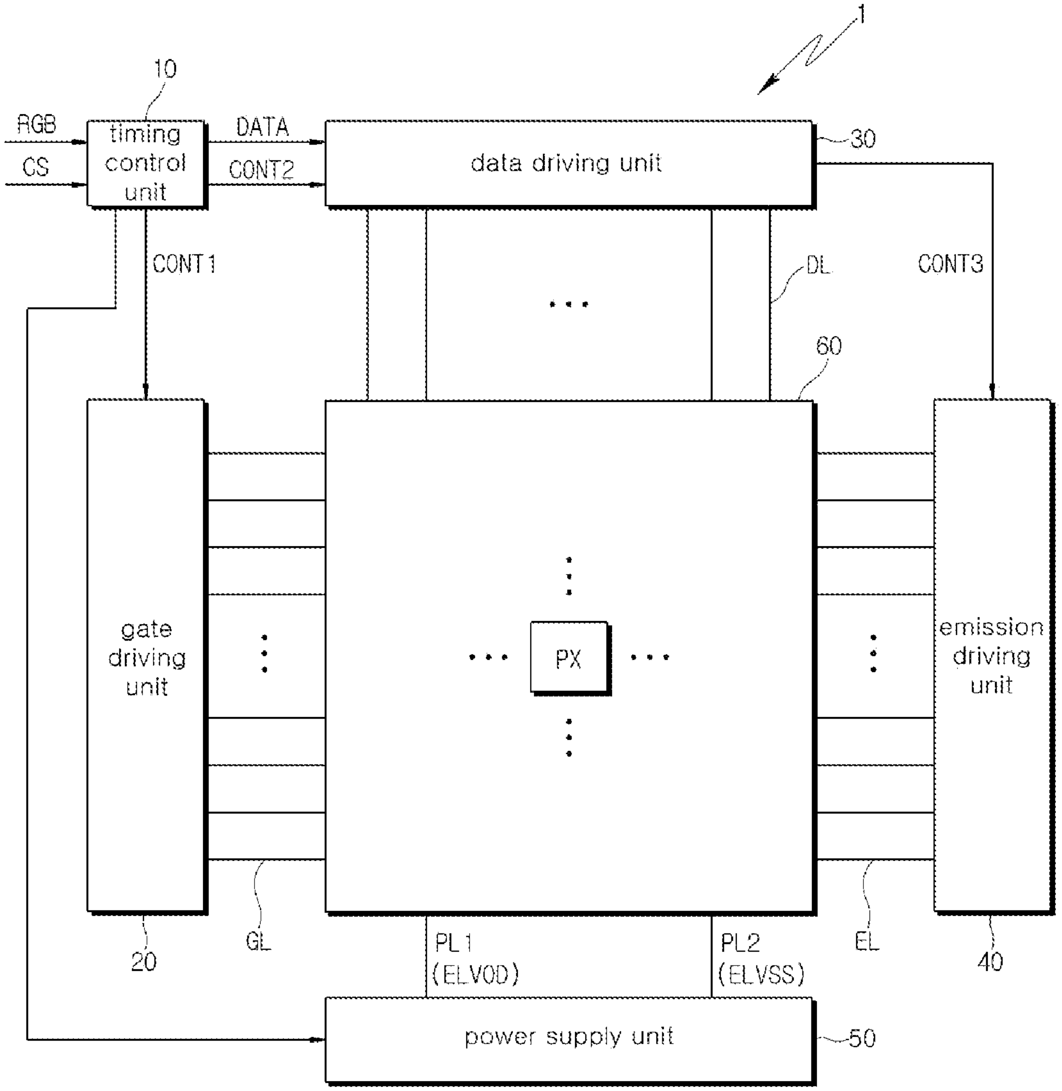
FIG. 1 is a block diagram illustrating a display device according to an embodiment.

Hereinafter, embodiments are described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can be defined by associated components.

The terms "first," "second," etc. are used to describe various components, but the components should not be limited by these terms. The terms are used only for distinguishing one component from another component. For example, a first component may be referred to as a second component and, similarly, the second component may be referred to as the first component, without departing from the scope of the embodiments. As used herein, the singular forms are intended to include the plural forms as well, unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a block diagram illustrating a display device according to an embodiment;

With reference to FIG. 1, the display device 1 includes a timing control unit 10 (e.g., a timing controller), a gate driving unit 20 (e.g., a gate driving circuit or gate driver), a data driving unit 30 (e.g., a data driving circuit or data driver), an emission driving unit 40 (e.g., an emission driving circuit), a power supply unit 50 (e.g., a power supply circuit), and a display panel 60.

The timing control unit 10 (e.g., a timing controller) may receive video signals RGB and control signals CS from external host systems or the like. The video signals may include a plurality of gradation data. The control signals CS may include a data enable signal, a horizontal synchronization signal, a vertical synchronization signal, and a main clock.

The timing control unit 10 processes the video signals RGB and control signals CS to suit the operating conditions of the display panel 60, and it may generate and output video data DATA, a gate driving control signal CONT1, a data driving control signal CONT2, an emission driving control signal CONT3, and a power supply control signal CONT4.

The gate driving control signal CONT1 may include scan timing control signals such as gate start pulse, gate shift clock, and gate output enable signals. The data driving control signal CONT2 may include data timing control signals such as source sampling clock, polarity control, and source output enable signals.

The timing control unit 10 may be placed on a control printed circuit board connected to the source printed circuit board, on which the data driving unit 30 is bonded, through a connection medium such as flexible flat cable (FFC) or flexible printed circuit (FPC). For example, the timing control unit 10 may be connected to the data driving unit 30 through embedded clock PP interface (EPI) wire pairs to transmit and receive data.

The gate driving unit 20, in response to the gate control signals CONT1 received from the timing control unit 10, may sequentially output gate signals through the gate lines GL within one horizontal period. Accordingly, the pixel rows connected to each gate line GL may be turned on in one horizontal period. During one horizontal period, data signals may be applied to the turned-on pixel rows through the gate lines GL.

The gate driving unit 20 may be composed of stage circuits connected respectively to a plurality of gate lines GL and may be mounted on the display panel 60 in the form of Gate in Panel (GIP). The gate driving unit 20 may include shift registers, level shifters, or the like.

The data driving unit 30 may convert the digital video data DATA received from the timing control unit 10 into analog data signals according to the data driving control signal CONT2. The data driving unit 30 may apply the analog data signals to corresponding pixels PX through the data lines DL.

The data driving unit 30 may be implemented as a source drive circuit or a source drive integrated circuit (IC). The data driving unit 30 may be connected to the bonding pads of the display panel 60 using tape automated bonding (TAB) or chip on glass (COG) methods, or directly arranged on the display panel 60, and in some cases, it may be integrated and arranged within the display panel 60.

The emission driving unit 40 may generate emission signals based on the emission driving control signal CONT3 outputted from the timing control unit 10. The emission driving unit 40 may supply the generated gate signals to the pixels PX through a plurality of emission lines EL.

The power supply unit 50 may convert the voltage input from an external source, based on the power supply control signal CONT4 into a high-potential voltage ELVDD and a low-potential voltage ELVSS that are standard voltages for use in the display device 1. The power supply unit 50 outputs the generated driving voltages ELVDD and ELVSS to the components through power lines PL1 and PL2. The power supply unit 50 may be arranged on the control printed circuit board where the timing control unit 10 is positioned. Such a power supply unit 50 may be referred to as a power management integrated circuit (PMIC).

The display panel 60 includes a plurality of pixels PX (or sub-pixels) arranged thereon. The pixels PX may be arranged, for example, in a matrix form on the display panel 60. The pixels PX arranged in one pixel row are connected to the same gate line GL, and the pixels PX arranged in one pixel column are connected to the same data line DL. The pixels PX may emit light corresponding to the data signal supplied through the data lines DL.

In an embodiment, each pixel PX may display one of the colors, red, green, and blue. In another embodiment, each pixel PX may display one of the colors, cyan, magenta, and yellow. In various embodiments, each pixel PX may display one of the colors, red, green, blue, and white.

The timing control unit 10, gate driving unit 20, data driving unit 30, emission driving unit 40, and power supply unit 50 may be configured as separate integrated circuits (ICs) or at least some of them may be integrated into a single integrated circuit. At least one of the gate driving unit 20 and the emission driving unit 40 may be configured to be formed integrally with the display panel 60 in an in-panel (IP) manner.

In an embodiment, the display device 1 may be driven in a variable refresh rate (VRR) mode where the driving frequency can be adjusted. The refresh rate may refer to the period/frequency at which data voltage is supplied (or programmed) to the pixels. For example, the display device 1 may be driven with a refresh rate higher or lower than a predetermined reference refresh rate. When the display device 1 is driven with a refresh rate lower than the reference refresh rate, it is referred to as "low-speed operation," or a "a first mode or a low-speed mode" and when it is driven with a refresh rate higher than the reference refresh rate, it is referred to as "high-speed operation" or a "a second mode or a high-speed mode". During low-speed operation, the display device 1 programs the data voltage to the pixels with a lower period/frequency than the reference refresh rate, while in high-speed operation, it programs the data voltage with a higher period/frequency than the reference refresh rate. The refresh rate may be determined based on factors such as the type of a displayed image, but is not limited thereto.

Figure 2:
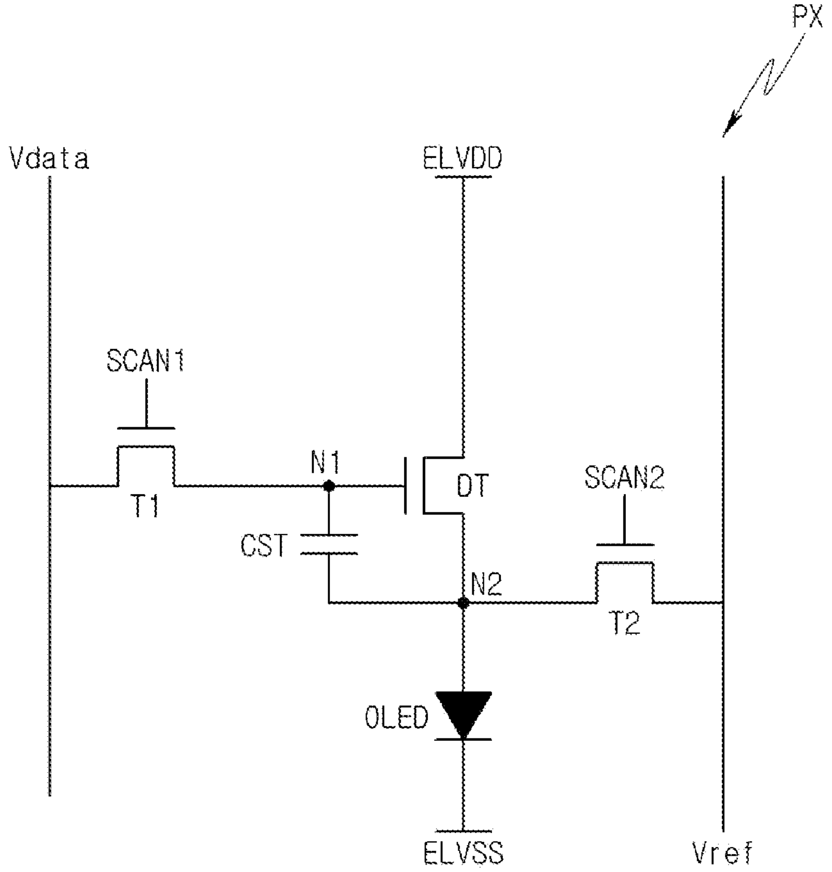
FIG. 2 is a circuit diagram illustrating a pixel of a display device according to an embodiment.

FIG. 2 is a circuit diagram illustrating a pixel of a display device according to an embodiment.

The pixel PX is depicted as an example in FIG. 2 merely for the purpose of explanation and not limited in configuration if possible to control the emission of the emissive component OLED. For example, the pixel PX may include additional switching TFTs, and the connection relationship of the switching TFTs or the connection position of capacitors may also be varied. For the convenience of explanation, the following description is made with the pixel PX with a driving circuit of 3T1C.

With reference to FIG. 2, the pixel PX according to an embodiment may include a driving transistor DT and an emissive component OLED connected to the pixel PX.

The pixel PX may drive the emissive component OLED by controlling the driving current flowing the emissive component OLED. The pixel PX may include a driving transistor DT, a scan transistor T1, an initialization transistor T2, and a storage capacitor CST. The transistors DT and T1 to T2 may each include a first electrode, a second electrode, and a gate electrode. One of the first and second electrodes may be a source electrode, and the other may be a drain electrode.

The transistors DT and T1 to T2 may each be a positive-channel metal oxide semiconductor (PMOS) transistor or a negative-channel metal oxide semiconductor (NMOS) transistor. The following description focuses on the case where the each of the transistors DT, T1, and T2 is an NMOS transistor. Therefore, the transistors DT, T1, and T2 may be turned on when a high-level voltage is applied.

The emissive component OLED may include an anode electrode and a cathode electrode. The anode electrode of the emissive component OLED may be connected to the second node N2, and the cathode electrode may be connected to a low-potential driving voltage ELVSS.

The driving transistor DT may include a first electrode applied with a high-potential voltage ELVDD, a second electrode connected to the second node N2, and a gate electrode connected to the first node N1. The driving transistor DT may provide a driving current to the emissive component OLED based on the voltage of the first node N1 (or the data voltage stored in the storage capacitor CST to be described later).

The first transistor T1 may include a first electrode applied with the data voltage Vdata, a second electrode connected to the first node N1, and a gate electrode applied with the first scan signal SCAN1 through one of the gate lines (GL of FIG. 1). The first transistor T1 may be turned on in response to the scan signal SCAN1 and transmit the data voltage Vdata to the first node N1.

The second transistor T2 may include a first electrode applied with the initialization voltage Vdata, a second electrode connected to the first node N2, and a gate electrode applied with the second scan signal SCAN2 through one of the gate lines (GL of FIG. 1). The second transistor T2 may be turned on in response to the second scan signal SCAN2 and transmit the initial voltage Vref to the second node N2.

The storage capacitor CST may be connected between the first node N1 and the second node N2. The storage capacitor CST may store or maintain the voltage difference between the data voltage Vdata applied to the first node N1 and the initialization voltage Vref applied to the second node N2.

Figure 3:
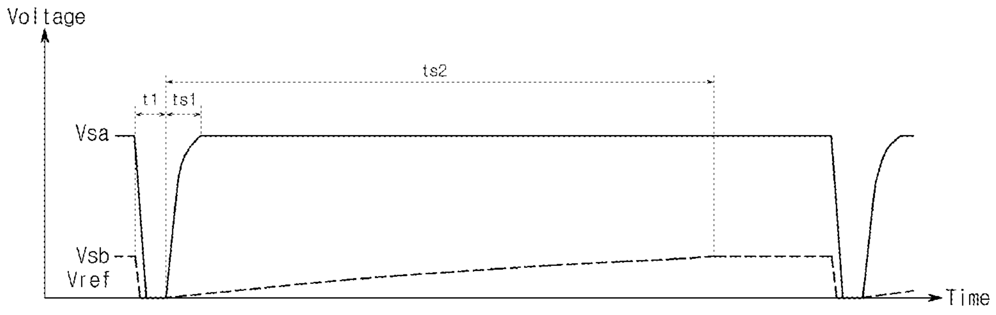
FIG. 3 is a graph illustrating a voltage at a source electrode of a driving transistor for high and low gradations according to an embodiment.

FIG. 3 is a graph illustrating the voltage at a source electrode of a driving transistor for high and low gradations according to one embodiment. In FIG. 3, the vertical axis represents the voltages Vsa and Vsb at the second node (N2, as shown in FIG. 2) for high and low gradations, respectively, along with the initialization voltage Vref. The horizontal axis represents time. In this specification, the data voltage for high gradation may be higher than the data voltage for low gradation.

With reference to FIGS. 2 and 3, during the first period t1, the initialization voltage Vref is applied to the second node N2 in response to the second scan signal SCAN2, and the data voltage Vdata is applied to the first node N1 in response to the first scan signal SCAN1.

The initialization voltage Vref is less than the voltages Vsa and Vsb at the second node N2 before the initialization voltage Vref is applied, therefore, during the first period t1, the voltages Vsa and Vsb at the second node N2 decrease to the level of the initialization voltage Vref.

Subsequently, during the second period ts1 and ts2, the voltages Vsa and Vsb at the second node N2 increase. The second period ts1 and ts2 may be a period during which the voltages Vsa and Vsb at the second node N2 increase for both high gradation and low gradation. The duration of the second period ts1 for high gradation may be shorter than the duration of the second period ts2 for low gradation. That is, the duration of the second period ts2 for low gradation may be longer than the duration of the second period ts1 for high gradation. During the second period ts1 and ts2, the degree to which the voltages Vsa and Vsb at the second node N2 increase may vary depending on the stored voltage difference in the storage capacitor CST. That is, the data voltage Vdata being stored in the storage capacitor CST is higher for high gradation than for low gradation, resulting in a larger driving current flowing for high gradation than for low gradation, which means that the voltage Vsa at the second node N2 for high gradation may rise faster than the voltage Vsb at the second node N2 for low gradation. In other words, the saturation time of the voltage Vsa at the second node N2 for high gradation may be shorter in time than the saturation time of the voltage Vsb at the second node N2 for low gradation.

Figure 4:
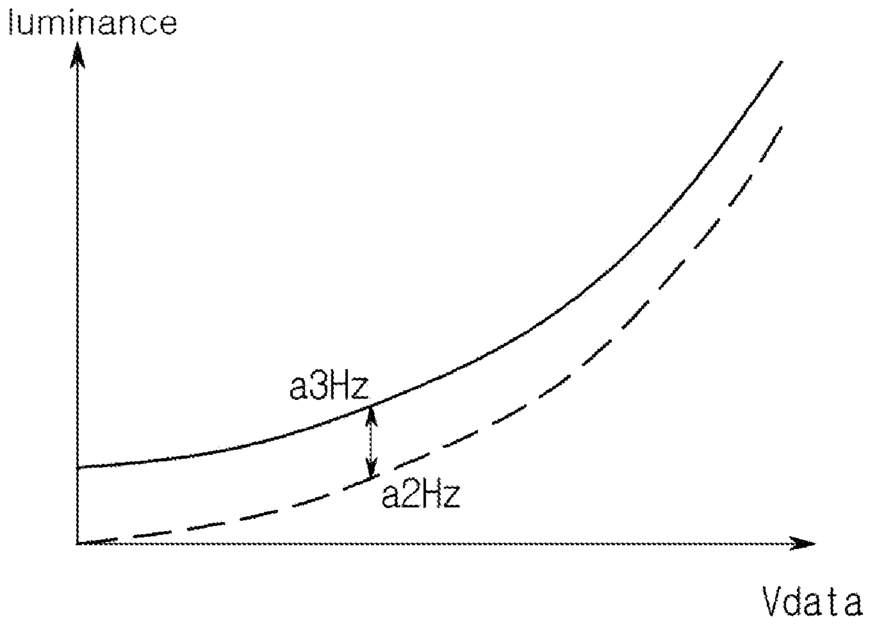
FIG. 4 is a graph illustrating the luminance variation at different frequencies according to an embodiment.

FIG. 4 is a graph illustrating the luminance variation at different frequencies.

With reference to FIGS. 2 to 4, the display device 1 may operate in the variable refresh rate mode VRR where the driving frequency can be adjusted as described with reference to FIG. 1. In the display device 1 according to an embodiment, the length of the second period ts1 and ts2 may vary depending on the driving frequency. For example, a2 driving frequency a2 Hz and a3 driving frequency a3 Hz are illustrated. The a3 driving frequency a3 Hz may be less than the a2 driving frequency a2 Hz. In the display device 1 according to an embodiment, frame transition to the next frame may occur after the elapse of the second period ts1 and ts2 for lower driving frequencies, whereas for higher driving frequencies, frame transition to the next frame may occur before the second period ts1 and ts2 is fully completed. Therefore, in frames with higher driving frequencies, compared to frames with lower driving frequencies, a larger voltage difference may be stored in the storage capacitor CST during the active period.

Especially due to the longer duration of the second period ts2 for low gradation, sufficient luminance may not be achieved in frames with higher driving frequencies. As a result, as shown in FIG. 4, even with the same data voltage Vdata applied at a2 driving frequency a2 Hz and a3 driving frequency a3 Hz, a difference in luminance can be observed.

Figure 5:
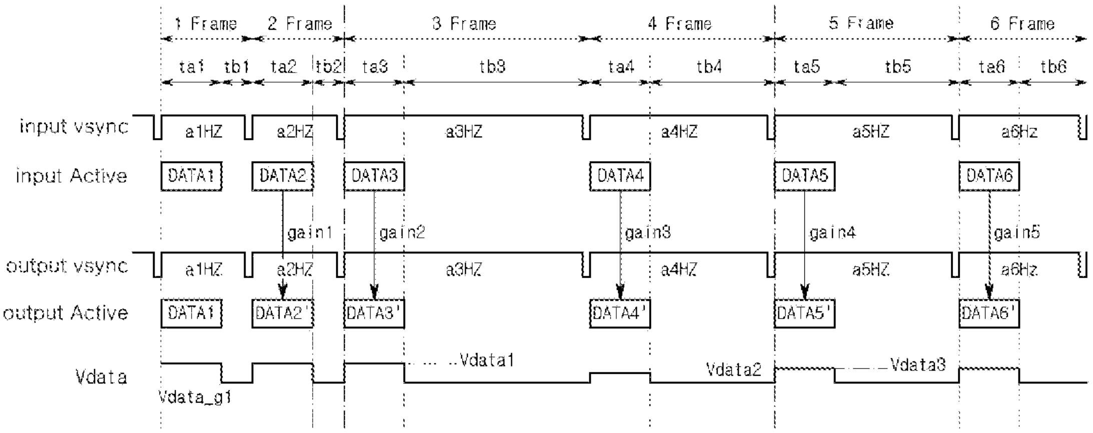
FIG. 5 is a diagram illustrating waveforms of signals inputted to a display device according to an example embodiment.
Figure 6:
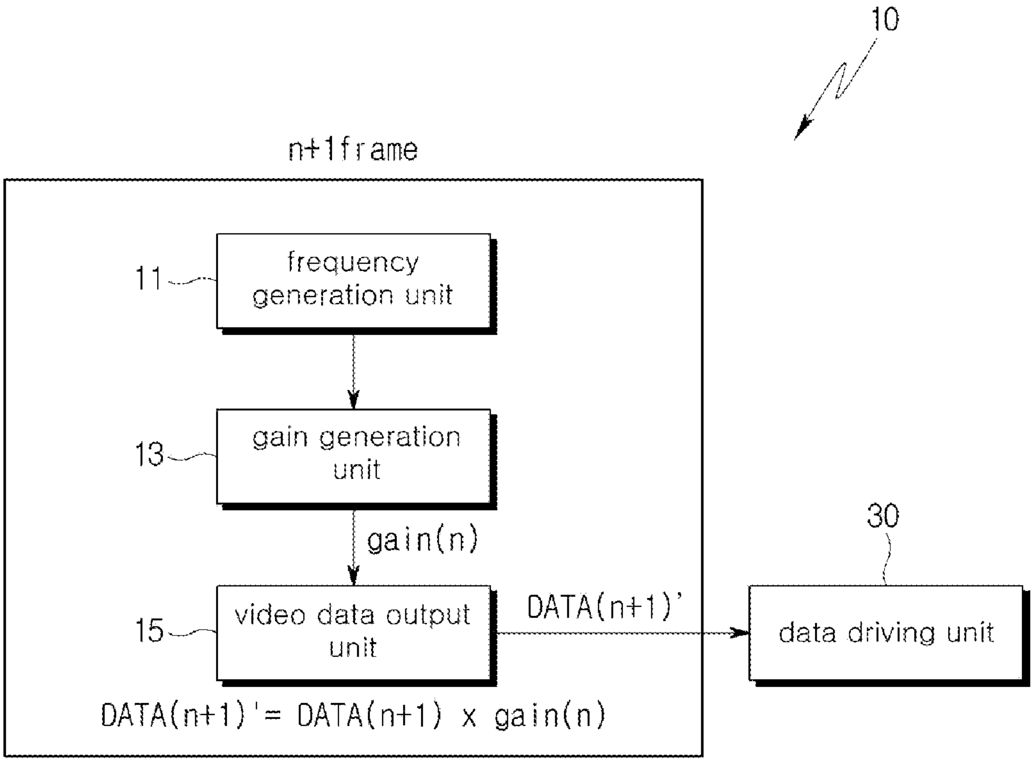
FIG. 6 is a diagram illustrating a configuration of a timing control unit according to an embodiment.

FIG. 5 is a diagram illustrating waveforms of signals inputted to a display device according to an embodiment. FIG. 6 is a diagram illustrating a configuration of a timing control unit according to an embodiment.

In FIG. 5, the first frame (1 Frame) to sixth frame (6 Frame) are shown, and the horizontal synchronization signal vsync is input before the start of each frame from first to sixth frames 1 Frame to 6 Frame. For example, the first frame 1 Frame may have a first driving frequency a1 Hz, the second frame 2 Frame may have a second driving frequency a2 Hz, the third frame 3 Frame may have a third driving frequency a3 Hz, the fourth frame 4 Frame may have a fourth driving frequency a4 Hz, the fifth frame 5 Frame may have a fifth driving frequency a5 Hz, and the sixth frame 6 Frame may have a sixth driving frequency a6 Hz. For example, the first driving frequency a1 Hz may be approximately 144 Hz, the second driving frequency a2 Hz may be approximately 144 Hz, the third driving frequency a3 Hz may be approximately 56 Hz, the fourth driving frequency a4 Hz may be approximately 80 Hz, the fifth driving frequency a5 Hz may be approximately 80 Hz, and the sixth driving frequency a6 Hz may be approximately 120 Hz. The first driving frequency a1 Hz and the second driving frequency a2 Hz may be the same, and the third driving frequency a3 Hz may be less than the first driving frequency a1 Hz, the fourth driving frequency a4 Hz may be between the second and third driving frequencies a2 Hz and a3 Hz, the fifth driving frequency a5 Hz may be the same as the fourth driving frequency a4 Hz, and the sixth driving frequency a6 Hz may be between the first and fifth driving frequencies a1 Hz and a5 Hz.

With reference to FIGS. 2 to 6, the first to sixth frames 1 Frame to 6 Frame may include respective active periods ta1 to ta6 and respective blanking periods tb1 to tb6. During the active periods ta1 to ta6, the scan transistor T1 of FIG. 2 may be turned on, allowing the data voltage Vdata to be input to the first node N1. The timing control unit 10 may include, for example, a frequency generation unit 11 (e.g., a circuit such as an IC), a gain generation unit 13 (e.g., a circuit such as an IC), and a video data output unit 15 (e.g., a circuit such as an interface). During the active periods ta1 to ta6, the timing control unit 10 may provide video data DATA to the data driving unit 30 through the video data output unit 15. During the first active period, the first video data DATA1 may be provided; during the second active period, the second video data DATA2' may be provided; during the third active period, the third video data DATA3' may be provided; during the fourth active period, the fourth video data DATA4' may be provided; during the fifth active period, the fifth video data DATA5' may be provided; and during the sixth active period, the sixth video data DATA6' may be provided.

In one embodiment, input video data for a given frame is multiplied by a gain value that is derived from a previous frame's frequency as further described below. The second video data DATA2' may be obtained by multiplying the second video data DATA2 by a gain value gain1 stored in the lookup table of the timing control unit 10. Similarly, the third video data DATA3' may be obtained by multiplying the third video data DATA3 by a gain value gain2 stored in the lookup table of the timing control unit 10. The fourth video data DATA4' may be generated by multiplying the third gain value gain3 stored in the lookup table of the timing control unit 10 with the fourth video data DATA4. The fifth video data DATA5' may be generated by multiplying the fourth gain value gain4 stored in the lookup table of the timing control unit 10 with the fifth video data DATA5. The sixth video data DATA6' may be generated by multiplying the fifth gain value gain5 stored in the lookup table of the timing control unit 10 with the sixth video data DATA6. Although the description is made of an exemplary case where the video data is generated by multiplying gain values derived from the previous frame's frequency, this embodiment is not limited thereto, and the calculated gain values may be applied to the original data through various formulas including addition of gain values. In some embodiments, the video data may be generated by not only multiplying gain values derived from the previous frame's frequency but also taking into account offsets.

The gain values gain1 to gain 5 may be calculated based on the driving frequencies a1 Hz to a5 Hz of the previous frames from 1 Frame to 5 Frame. The frequency generation unit 11 may calculate (or derive) the frequencies of the frames 1 Frame to 5 Frame after the frames 1 Frame to 5 Frame have passed. The frequency information of a previous frame computed (or calculated) by the frequency generation unit 11 is provided to the gain generation unit 13. The gain generation unit 13 extracts the corresponding gain values gain1 to gain5, based on the calculated frequency information. In one embodiment, the magnitude of the gain values are proportional to the magnitude of the frequencies. For example, assuming the first driving frequency a1 Hz as the reference frequency, the first gain value gain1 serves as the baseline gain value, the second gain value gain2 may be the same as the first gain value gain1 since the frequency of the first frame 1 Frame and the frequency of the second frame 2 Frame are the same, the third gain value gain3 may be less than the first gain value gain1 since the third driving frequency a3 Hz is less than the first driving frequency a1 Hz, the fourth gain value gain4 may be less than the first gain value gain1 and greater than the third gain value gain3 because the fourth driving frequency a4 Hz is less than the first driving frequency a1 Hz and greater than the third driving frequency a3 Hz. The fifth gain value gain5 may be the same as the fourth gain value gain4 because the fourth driving frequency a4 Hz is equal to the fifth driving frequency a5 Hz (gain3<gain4=gain5<gain1=gain2).

That is, the display device according to an embodiment is capable of improving the luminance of the output image in such a way as to calculate the gain values gain1 to gain5 based on the driving frequencies a1 Hz to a5 Hz of the previous frames from 1 Frame to 5 Frame and multiply, when the video data is outputted through the video data output unit 15 in the respective frames from 2 Frame to 6 Frame, the original video data output by the data driving unit 30 by the gain values gain1 to gain5 obtained through the frequency generation unit 11 and the gain generation unit 13 to output the video data DATA2' to DATA6' to the data driving unit 30.

In FIG. 5, during the active periods ta1 to ta6 of frame 5, the data voltage Vdata may be a data voltage analog-converted by the data driving unit 30 based on the converted video data DATA1 and DATA2' to DATA6' from the respective frames 1 Frame to 6 Frame.

Assuming the originally intended video data DATA1 to DATA6 are all the same, and considering the gain values gain1 to gain5, the magnitudes of the converted video data DATA1 and DATA2' to DATA6' during the respective active period ta1 to ta6 may have a relationship of DATA4'<DATA5'=DATA6'<DATA1=DATA2'=DATA3'. The magnitude of the data voltage Vdata may be determined in proportional to the magnitudes of the converted video data DATA1 and DATA2' to DATA6' during the respective active period ta1 to ta6. That is, the data voltage Vdata may have the first voltage level Vdata1 during the active periods ta1 to ta3 of the first to third frames 1 Frame to 3 Frame, a second voltage level Vdata2 that is less than the first voltage level Vdata1 during the fourth active period ta4 of the fourth frame 4 Frame, and a third voltage level Vdata3 that is less than the first voltage level Vdata1 and greater than the second voltage level Vdata2 during the fifth and sixth active periods ta5 and ta6 of the fifth and sixth frames 5 Frame and 6 Frame.

Meanwhile, during the respective blanking periods tb1 to tb6, the data voltage Vdata may have a voltage level Vdata_g1 that is greater than 0 and less than the second voltage level Vdata2. During the blanking periods tb1 to tb6, the scan transistor T1 is turned off, so the data voltage Vdata may not be applied to the second node N2. However, by allowing the data voltage Vdata to have the voltage level Vdata_g1 greater than 0 and less than the second voltage level Vdata2 during the blanking periods tb1 to tb6, it is possible to prevent the occurrence of a phenomenon where the luminance of the first line of pixels PX becoming low when another frame 2 Frame to 6 Frame starts after the blanking period tb1 to tb6, by rapidly generating the data voltage Vdata.

Figure 7:
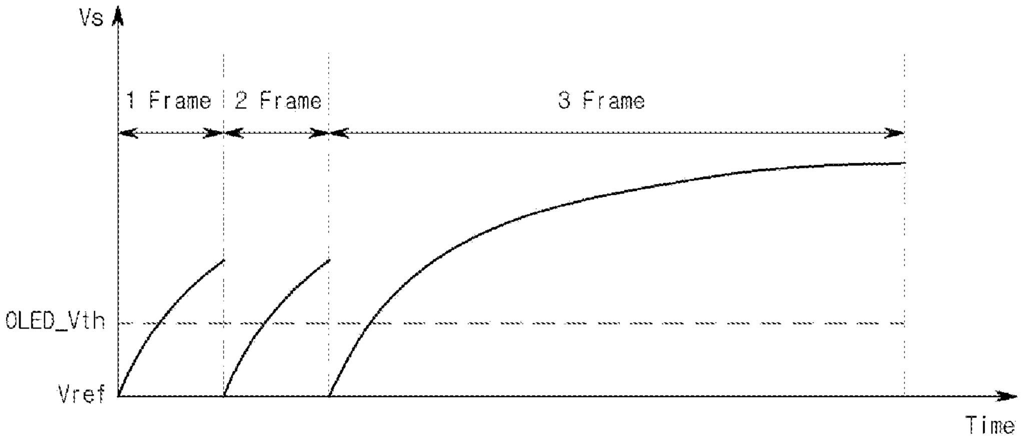
FIG. 7 is a graph illustrating the voltage at a source electrode of a driving transistor during frames in a display device according to an embodiment.

FIG. 7 is a graph illustrating the voltage at a source electrode of a driving transistor during frames in a display device according to an embodiment. FIG. 7 exemplarily shows the variation of the voltage Vs at the second node during the first to third frames 1 Frame to 3 Frame in FIG. 5.

As described with reference to FIG. 5, assuming the originally intended video data DATA1 to DATA6 are all the same, and considering the gain values gain1 to gain5, the magnitudes of the converted video data DATA1 and DATA2' to DATA6' during the respective active periods ta1 to ta6 may have a relationship of DATA4'<DATA5'=DATA6'<DATA1=DATA2'=DATA3'.

In the display device 1 according to an embodiment, for the third video data DATA3', which has the same size as the first and second video data DATA1 and DATA2' as described with reference to FIG. 5, the frame transition to the next from may occur after the elapse of the second period ts1 and ts2 for the lower driving frequencies whereas for the high driving frequencies the frame transition to the next frame may occur before the second period ts1 and ts2 is not completed.

That is, with reference to FIG. 7, the duration of the third frame 3 Frame is longer than the duration of the first and second frames 1 Frame and 2 Frame, and the storage capacitor CST may store a large voltage difference in the third frame 3 Frame compared to the storage capacitor CST in the first and second frames 1 Frame and 2 Frame with higher driving frequencies.

Therefore, as shown in FIG. 7, during the emission period of the light-emitting element EL that exceeds the threshold voltage Vth, the voltage increment at the second node N2 of the third frame 3 Frame may be greater than the voltage increment at the second node N2 of the first and second frames 1 Frame and 2 Frame. As a result, a luminance that is greater than the originally intended luminance may occur in the third frame 3 Frame.

The following embodiments provide methods to prevent the luminance from becoming greater than the originally intended luminance in the frame having a lower driving frequency compared to the previous frame.

Figure 8:
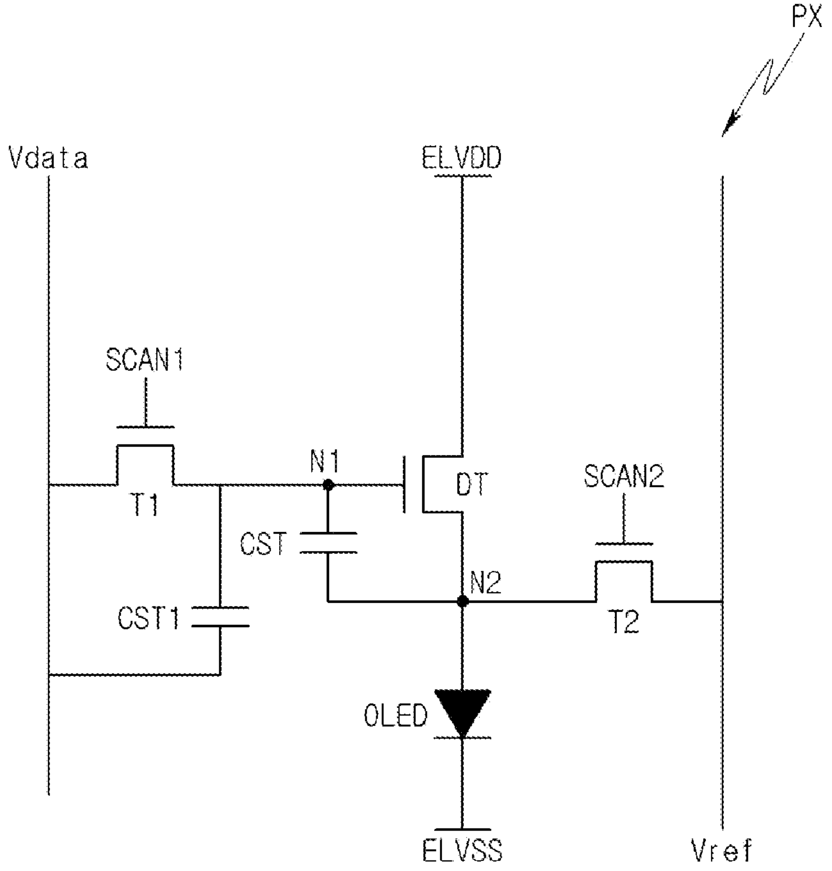
FIG. 8 is a circuit diagram illustrating a pixel of a display device according to another embodiment.
Figure 9:
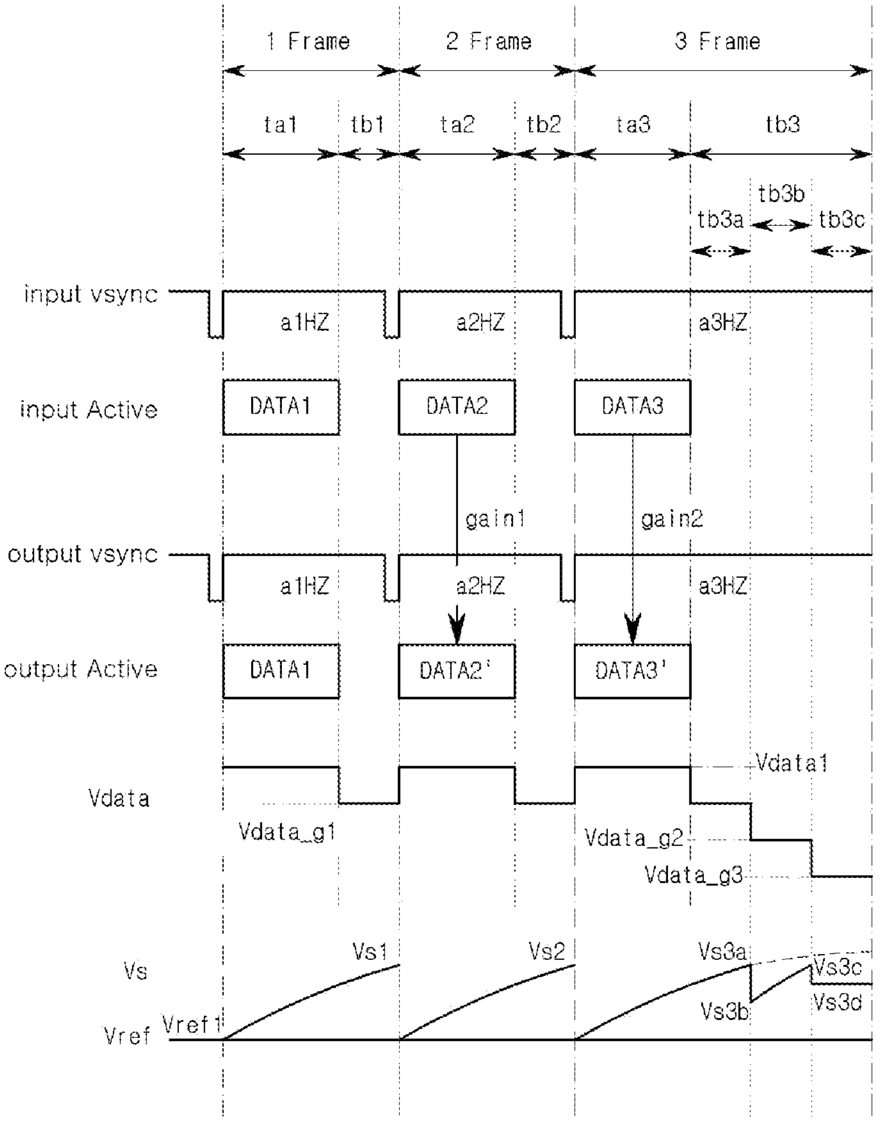
FIG. 9 is a diagram illustrating the waveforms of signals input to a display device according to another embodiment.
Figure 10:
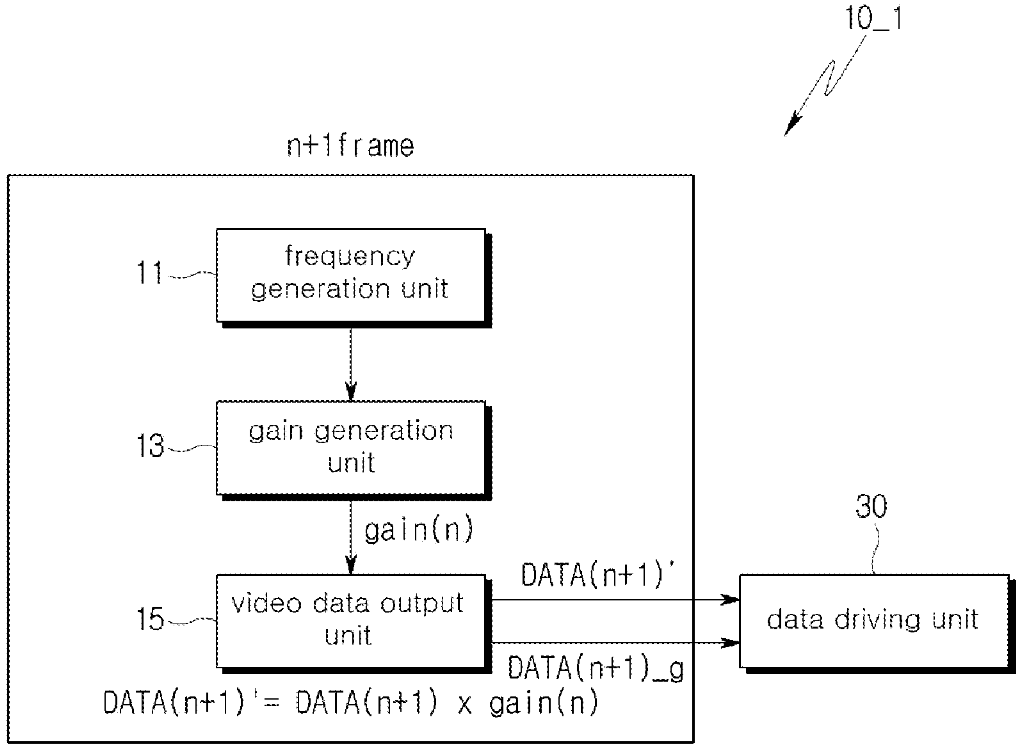
FIG. 10 is a diagram illustrating a configuration of a timing control unit according to another embodiment.
Figure 11:
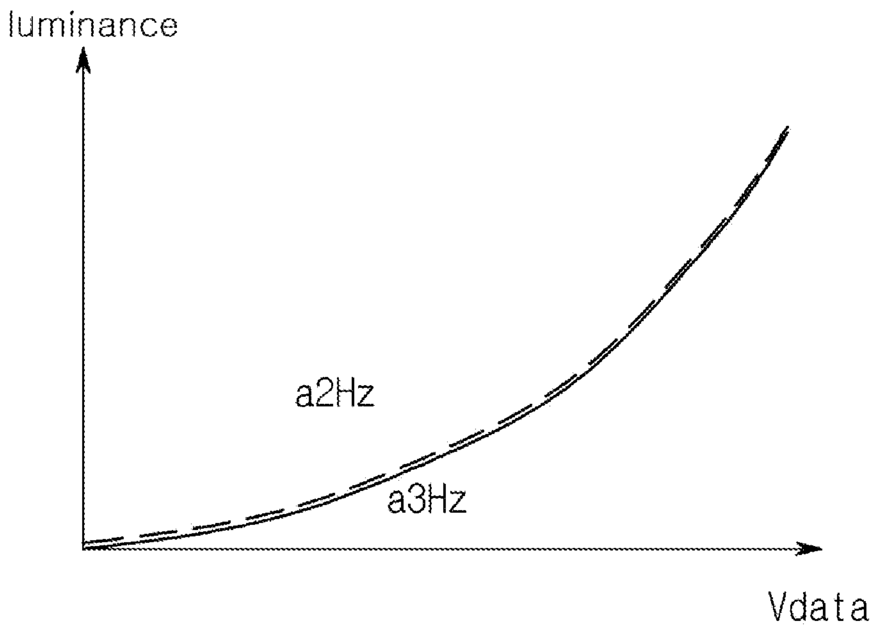
FIG. 11 is a graph illustrating the luminance variation based on data voltage at different frequencies according to an embodiment.

FIG. 8 is a circuit diagram illustrating a pixel of a display device according to another embodiment. FIG. 9 is a diagram illustrating the waveforms of signals input to a display device according to another embodiment. FIG. 10 is a diagram illustrating a configuration of a timing control unit according to another embodiment. FIG. 11 is a graph illustrating the luminance variation based on data voltage at different frequencies. FIG. 8 is a circuit diagram of a pixel PX during the blank period.

With reference to FIGS. 8 to 11, the data voltage Vdata_1 is applied through the data line (DL in FIG. 1 during the blank periods tb1 to tb6. However, during the blanking period tb1 to tb6, the scan transistor T1 may be turned off, and the data voltage Vdata_1 may not be applied to the first node N1.

On the other hand, since the data voltage Vdata_1 is applied to the data line (DL in FIG. 1), a parasitic capacitor CST1 may be formed between the data line DL and the first node N1. By utilizing the parasitic capacitor CST1 formed between the data line DL and the first node N1 during the blanking period tb1 to tb6, it is possible to resolve the issue where a luminance that is greater than the intended luminance occurs in a frame with a driving frequency of a frame is less than the driving frequency of the previous frame, as described with reference to FIG. 7.

As shown in FIG. 7, during the emission period exceeding the threshold voltage Vth of the light-emitting device EL in each frame Frame 1 Frame to 3 Frame, the maximum voltage at the second node N2 in the first and second frames 1 Frame and 2 Frame may be respectively the first voltage level Vs1 and the second voltage level Vs2. Furthermore, as described with reference to FIG. 7, the duration of the third frame 3 Frame may be longer than the duration of the first and second frames 1 Frame and 2 Frame, and the storage capacitor CST in the third frame 3 Frame may store a larger voltage difference compared to the storage capacitors CST in the first and second frames 1 Frame and 2 Frame with higher driving frequencies, allowing the maximum voltage at the second node N2 in the third frame 3 Frame to exceed each of the first voltage level Vs1 and the second voltage level Vs2.

However, according to the embodiment of FIGS. 8 to 11, during the third blanking period tb3, the voltage level of the data voltage Vdata may be reduced compared to the voltage level Vdata_g1 of the data voltage during the first and second blanking periods tb1 and tb2, thereby reducing the voltage of the second node N2 through the parasitic capacitor CST1 as described with reference to FIG. 8. To achieve this, the frequency generation unit 11 of the timing control unit 10_1 may count the duration of the third blanking period tb3 after the end of the third active period ta3 of the third frame 3 Frame.

In one embodiment, a blanking period may include a plurality of blank portions that each have a duration that is equal to a duration of a blank period from a previous frame. For example, the frequency generation unit 11 stores data regarding the duration of the first and second blanking periods tb1 and tb2 and, when a third-1 blanking period tb3*a* (e.g., a first blank period) of the same duration as each of the first and second blanking periods tb1 and tb2 has elapsed, controls the video data output unit 15 to provide, at the start of the third-2 blanking period tb3*b*, the data driving unit 30 with video data DATA3_*g* corresponding to the data voltage Vdata at the voltage level Vdata_g2 that is less than the voltage level Vdata_g1 during the third-1 blanking period tb3*a*. Subsequently, the data drive unit 30 applies the data voltage Vdata at a voltage level Vdata_g2 that is less than the voltage level Vdata_g1 corresponding to the video data DATA3_*g* to the data line (DL in FIG. 1). As a result, as shown in FIG. 9, the voltage at the second node N2 undergoes a change (Vs3*a* to Vs3*b* that is less than Vs3*a*).

Furthermore, the frequency generation unit 11, based on, for example, the data regarding the duration of the first and second blanking periods tb1 and tb2 or the stored data regarding the duration of the third-1 blanking period tb3*a*, may control the video data output unit 15 to provide, at the start of the third-3 blanking period tb3*c* (e.g., a third blank portion) after the third-2 blanking period tb3*b* (e.g., a second blank portion) has elapsed, the data driving unit 30 with the video data DATA3_*g* corresponding to the data voltage Vdata at the voltage level Vdata_g3 that is than the voltage level Vdata_g2 of the data voltage Vdata during the third-2 blanking period tb3*b*. Subsequently, the data drive unit 30 applies the data voltage Vdata at a voltage level Vdata_g3 that is less than the voltage level Vdata_g2 corresponding to the video data DATA3_*g* to the data line (DL in FIG. 1). As a result, as shown in FIG. 9, the voltage at the second node N2 undergoes a change (Vs3*c* to Vs3*d* that is less than Vs3*c*). [00%] Therefore, as shown in FIG. 11, there is no luminance difference between the a2 driving frequency a2 Hz and the a3 driving frequency a3 Hz.

Figure 12:
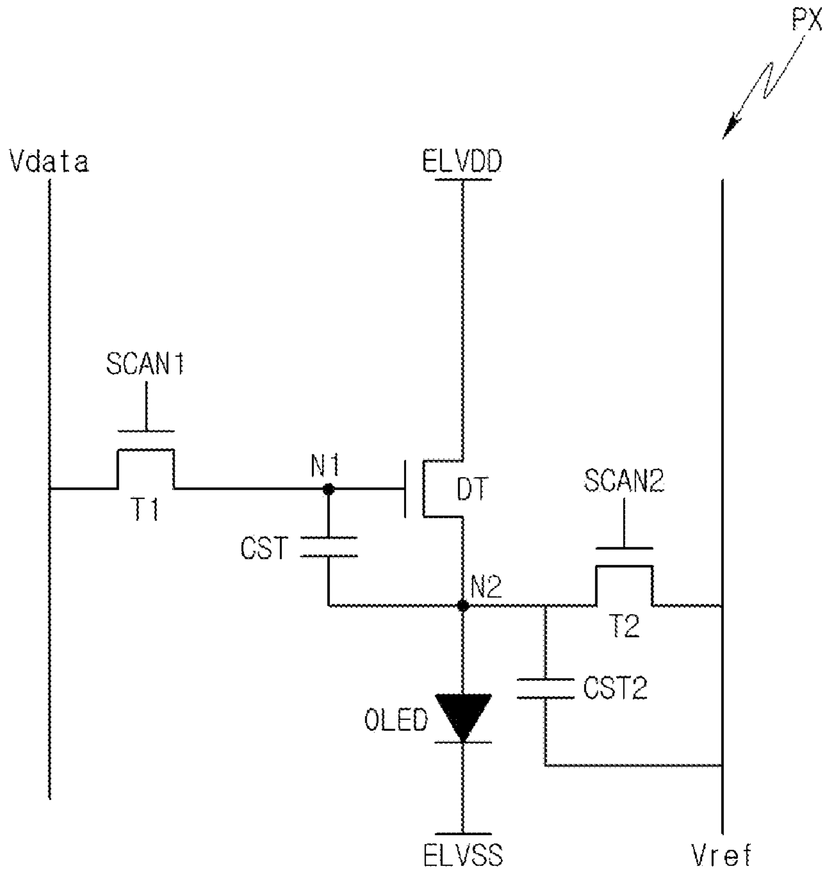
FIG. 12 is a circuit diagram illustrating a pixel of a display device according to another embodiment.
Figure 13:
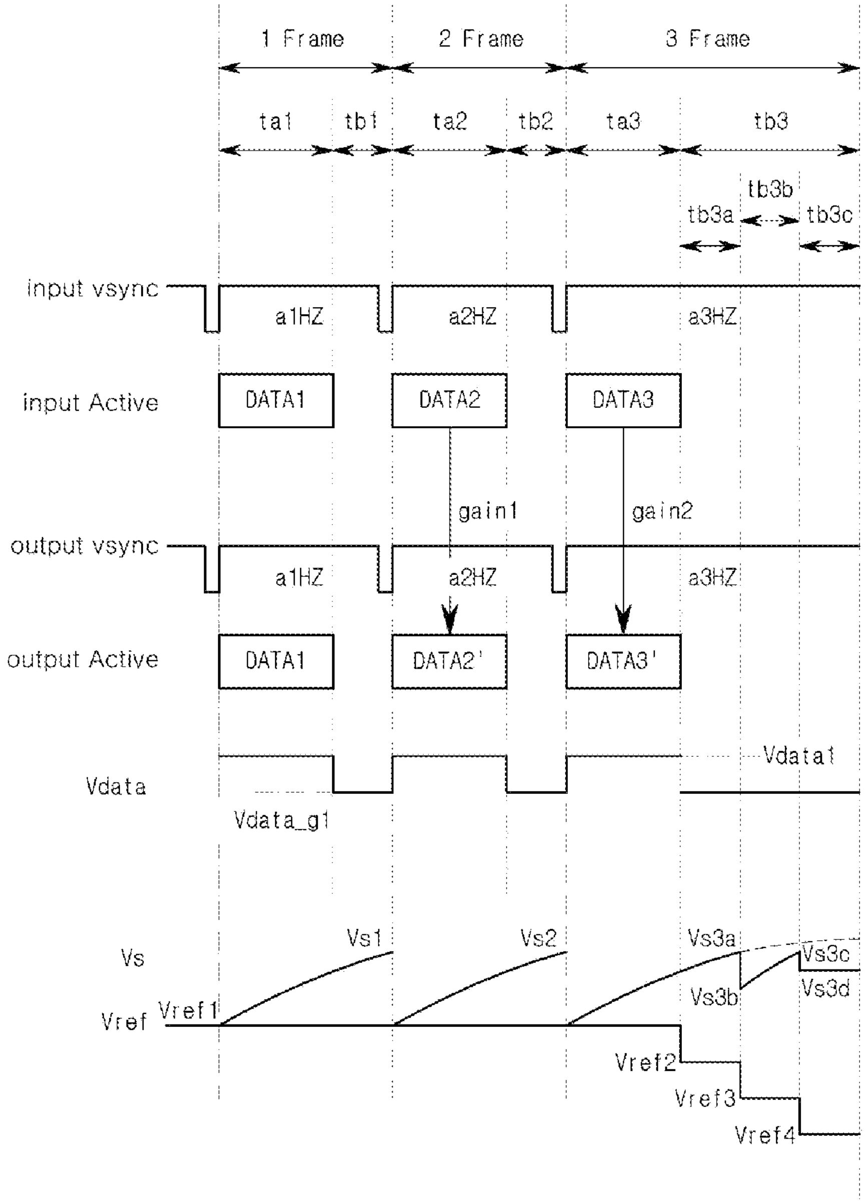
FIG. 13 is a diagram illustrating waveforms of signals input to the display device according to another embodiment.
Figure 14:
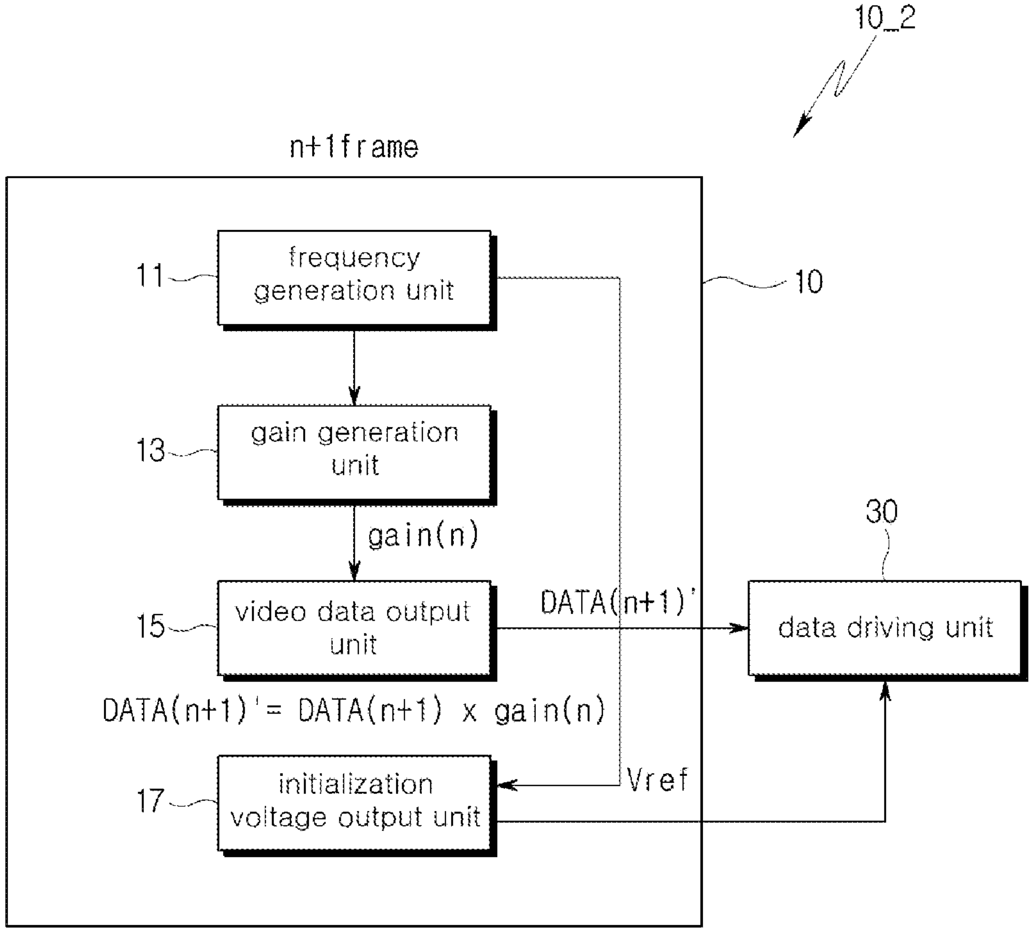
FIG. 14 is diagram illustrating a configuration of a timing control unit according to another embodiment.

FIG. 12 is a circuit diagram illustrating a pixel of a display device according to another embodiment. FIG. 13 is a diagram illustrating waveforms of signals input to the display device according to another embodiment. FIG. 14 is a diagram illustrating a configuration of a timing control unit according to another embodiment.

With reference to FIGS. 12 to 14, the data voltage Vdata is applied through the data line (DL in FIG. 1) during the blank periods tb1 to tb6. However, during the blanking period tb1 to tb6, the scan transistor T1 may be turned off, and the data voltage Vdata may not be applied to the first node N1.

Meanwhile, since the initialization voltage Vref is applied to the initialization voltage line, a parasitic capacitor CST2 may be formed between the initialization voltage line and the second node N2. By utilizing the parasitic capacitor CST2 during the blanking period tb1 to tb6, it is possible to resolve the issue where a luminance higher than intended occurs in a frame with a driving frequency that is less than the previous frame, as described with reference to FIG. 7.

As shown in FIG. 13, during the emission period exceeding the threshold voltage Vth of the light-emitting device EL in each frame Frame 1 Frame to 3 Frame, the maximum voltage at the second node N2 in the first and second frames 1 Frame and 2 Frame may be respectively the first voltage level Vs1 and the second voltage level Vs2. Furthermore, as described with reference to FIG. 7, the duration of the third frame 3 Frame may be longer than the duration of the first and second frames 1 Frame and 2 Frame, and the storage capacitor CST in the third frame 3 Frame may store a larger voltage difference compared to the storage capacitors CST in the first and second frames 1 Frame and 2 Frame with higher driving frequencies, allowing the maximum voltage at the second node N2 in the third frame 3 Frame to exceed the first voltage level Vs1 and the second voltage level Vs2.

However, in the embodiment of FIGS. 12 to 14, during the third blanking period tb3, the voltage level of the initialization voltage Vref may be reduced compared to the voltage level Vref1 of the initialization voltage Vref during the first and second blanking periods tb1 and tb2, thereby lowering the voltage of the second node N2 through the parasitic capacitor CST2 as described with reference to FIG. 12. To achieve this, the timing control unit 10_2 may further include the initialization voltage output unit 17 (e.g., a circuit), and the frequency generation unit 11 may count the duration of the third blanking period tb3 after the end of the third active period ta3 of the third frame 3 Frame.

For example, the frequency generation unit 11 stores data regarding the duration of the first and second blanking periods tb1 and tb2 and, when a third-1 blanking period tb3*a* of the same duration as the first and second blanking periods tb1 and tb2 has elapsed, controls the initialization voltage output unit 17 to provide, at the start of the third-2 blanking period tb3*b*, the data driving unit 30 with the initialization voltage of a voltage level Vref3 lower than the voltage level Vref2 of the initialization voltage during the third-1 blanking period tb3*a*. As a result, as shown in FIG. 13, the voltage at the second node N2 undergoes a change (Vs3*a* to Vs3*b* that is less than Vs3*a*).

Furthermore, the frequency generation unit 11, based on, for example, the data regarding the duration of the first and second blanking periods tb1 and tb2 or the stored data regard the duration of the third-1 blanking period tb3*a*, may control the initialization voltage output unit 17 to provide, at the start of the third-3 blanking period tb3*c* after the third-2 blanking period tb3*b* has elapsed, the data driving unit 30 with the initialization voltage at the voltage level Vref4 that is less than the voltage level Vref3 of the initialization voltage during the third-2 blanking period tb3*b*. As a result, as shown in FIG. 13, the voltage at the second node N2 undergoes a change (Vs3*c* to Vs3*d* that is less than Vs3*c*). Thus, the initialization voltage output unit 17 may decrease the initialization voltage a plurality of times in a stepwise manner during the third blanking period tb3 based on the counted duration of the second black period as shown in FIG. 9.

Therefore, even with different driving frequencies, it is possible to avoid differences in luminance.

For example, the display device may include a first frame with a first driving frequency and a second frame with a second driving frequency, a frequency generation unit configured to generate the first driving frequency of the first frame after the end of the first frame, a gain generation unit configured to receive information on the first driving frequency generated by the frequency generation unit and generate a first gain value of the second frame based on the first driving frequency of the first frame, and a video data output unit configured to output video data generated based on the first gain value to the data driving unit during the second frame.

For example, the display device may further include a third frame with a third driving frequency, wherein the frequency generation unit may generate the second driving frequency after the end of the second frame, the gain generation unit may generate a second gain value of the third frame based on the second driving frequency, the first driving frequency may be equal to the second driving frequency, the third driving frequency may be lower than the first driving frequency, and the first gain value and the second gain value may be equal.

For example, the display device may further include a fourth frame with a fourth driving frequency, wherein the frequency generation unit may generate the third driving frequency after the end of the third frame, the gain generation unit may generate a third gain value of the fourth frame based on the third driving frequency, and the third gain value may be less than the first gain value.

For example, the first frame may include a first active period and a first blank period, the second frame may include a second active period and a second blank period, the video data generation unit may output video data generated based on the first gain value to the data driving unit during the second active period, and the data driving unit may output a data voltage at a first voltage level to a pixel based on the video data generated based on the first gain value.

For example, the display device may output the data voltage at a second voltage level lower than the first voltage level to the pixel during the second blank period.

For example, the second voltage level may be maintained during the second blank period.

For example, the pixel may include an emissive component, a driving transistor, and a scan transistor, the driving transistor may include a first electrode applied with a high-potential voltage, a second electrode connected to an anode electrode of the emissive component, and a gate electrode connected to a first node, and the scan transistor may include a first electrode applied with data voltage, a second node connected to the first node, and a gate electrode applied with a first scan signal.

For example, the pixel may further include a parasitic capacitor formed between a data line applied with the data voltage and the first node.

For example, the frequency generation unit may count the duration of the second blank period after the end of the second active period.

For example, the video data output unit may decrease the second voltage level in a stepwise manner a plurality of times based on the counted duration of the second blank period.

For example, the pixel may further include an initialization transistor comprising a first electrode applied with an initialization voltage, a second electrode connected to the anode electrode, and a gate electrode applied with a second scan signal.

For example, the pixel further may include a parasitic capacitor formed between an initialization voltage line applying the initialization voltage and the anode electrode.

For example, the frequency generation unit may count the duration of the second blank period after the end of the second active period.

Figure 15:
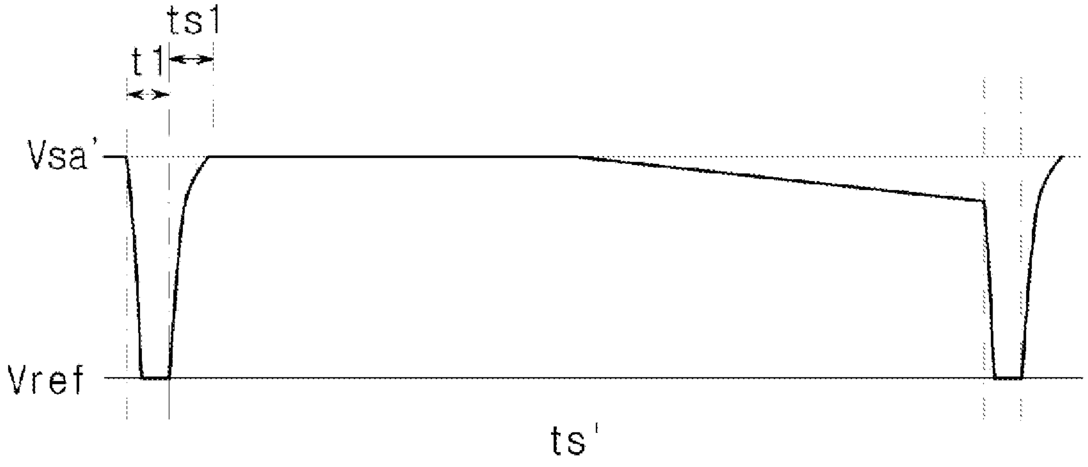
FIG. 15 is a graph illustrating a voltage of a source electrode of a driving transistor according to one embodiment.
Figure 16:
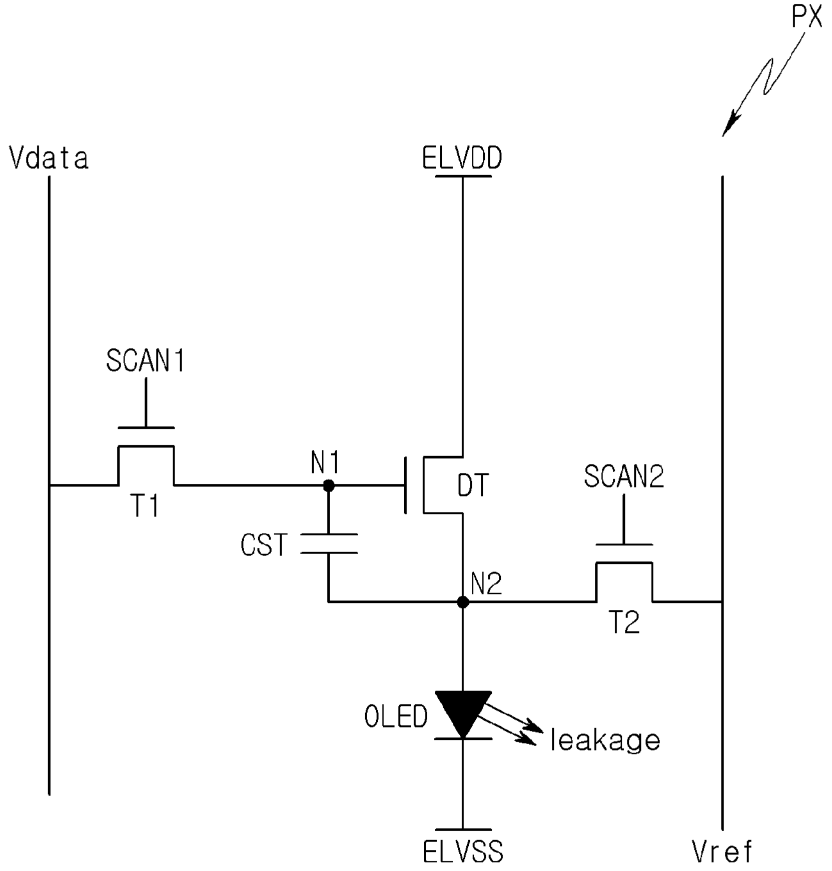
FIG. 16 is a mimetic diagram illustrating leakage current of the pixel circuit of the display device according to one embodiment.

FIG. 15 is a graph illustrating a voltage of a source electrode of a driving transistor according to one embodiment. FIG. 16 is a mimetic diagram illustrating leakage current of the pixel circuit of the display device according to one embodiment. The driving frequency of the display devices shown in FIGS. 15 and 16 may be a low frequency. That is, the display device may be driven at a low speed.

Referring to FIGS. 15 and 16, during the first period t1, the initialization voltage Vref is applied to the second node N2 in response to the second scan signal SCAN2, and the data voltage Vdata is applied to the first node N1 in response to the first scan signal SCAN1.

The initialization voltage Vref is less than a voltage Vsa' at the second node N2 before the initialization voltage Vref is applied, therefore, during the first period t1, the voltage Vsa' at the second node N2 drops (e.g., reduces) to the level of the initialization voltage Vref.

Subsequently, during the second period ts1, the voltage Vsa' of the second node (N2) increases. The second period ts1 may be a period in which the voltage Vsa' of the second node N2 increases. The voltage Vsa' of the second node N2 may be saturated at the end of the second period ts1 and may be maintained until a first time point ts'. After the first time point ts', the voltage Vsa' of the second node N2 may gradually decrease until the next first period t1.

Meanwhile, in the case of a low-speed display device of which the driving frequency is a low frequency, a refresh interval may be long. That is, a period during which the data voltage is not supplied to the pixel (see tb1 in FIG. 17) may be much longer than the period during which the data voltage is supplied to the pixel (see ta1 in FIG. 17). When the period during which the data voltage is not supplied to the pixel (see tb1 in FIG. 17) may be much longer than the period during which the data voltage is supplied to the pixel (see ta1 in FIG. 17), leakage current may, as shown in FIG. 16, occur from the emissive component OLED in a period tb1 during which the data voltage is not supplied to the pixel. When the leakage current occurs from the emissive component OLED, the difference voltage stored in the storage capacitor CST may decrease in the period during which the data voltage is supplied to the pixel (see ta1 in FIG. 17). When the difference voltage stored in the storage capacitor CST decreases, the driving current flowing through the emissive component OLED may gradually decrease in the period tb1 during which the data voltage is not supplied to the pixel, thereby reducing the luminance.

Figure 17:
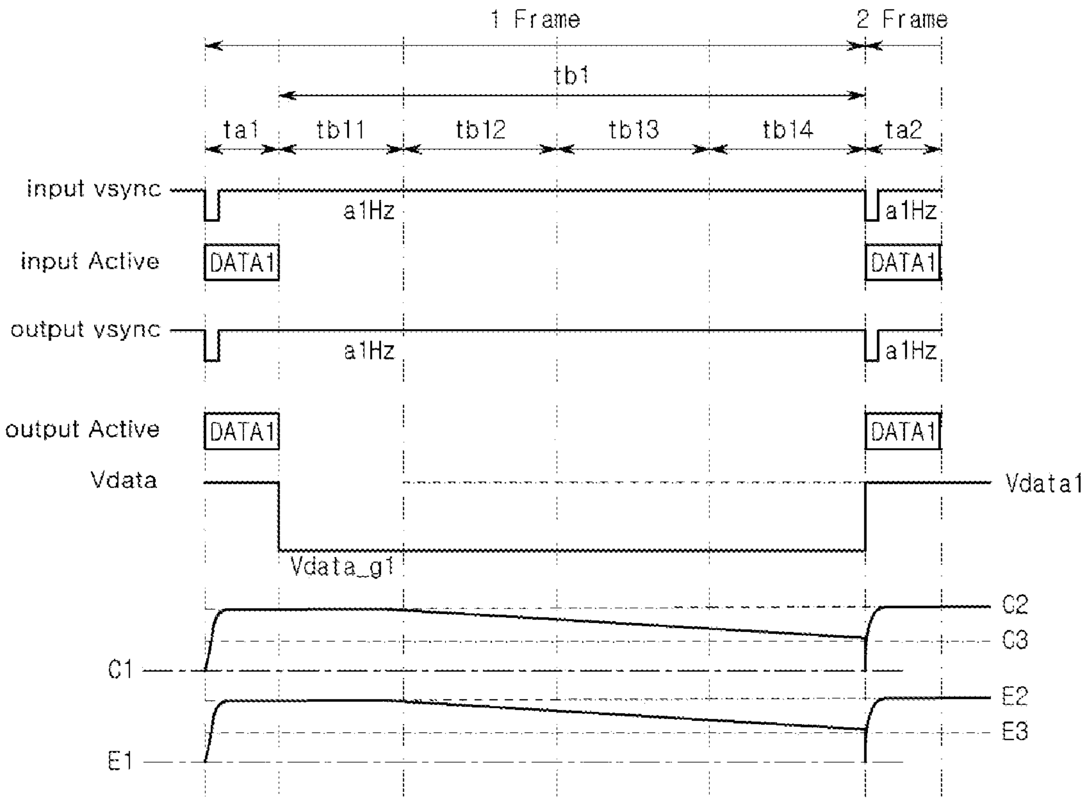
FIG. 17 is a waveform diagram illustrating signals input to the display device according to one embodiment.

FIG. 17 is a waveform diagram illustrating signals input to the display device according to the embodiment. The embodiment will be described with reference to not only FIG. 17 but also FIG. 6.

In FIG. 17, the first and second frames (1 Frame and 2 Frame) are illustratively shown, and the input horizontal synchronization signal vsync is input at the starting point of each of the first and second frames (1 Frame and 2 Frame). For example, the first frame (1 Frame) and the second frame (2 Frame) may have a first driving frequency a1 Hz. The first driving frequency a1 Hz may be a low frequency. For example, the first driving frequency a1 Hz may be 1 Hz, but is not limited thereto.

Figure 18:
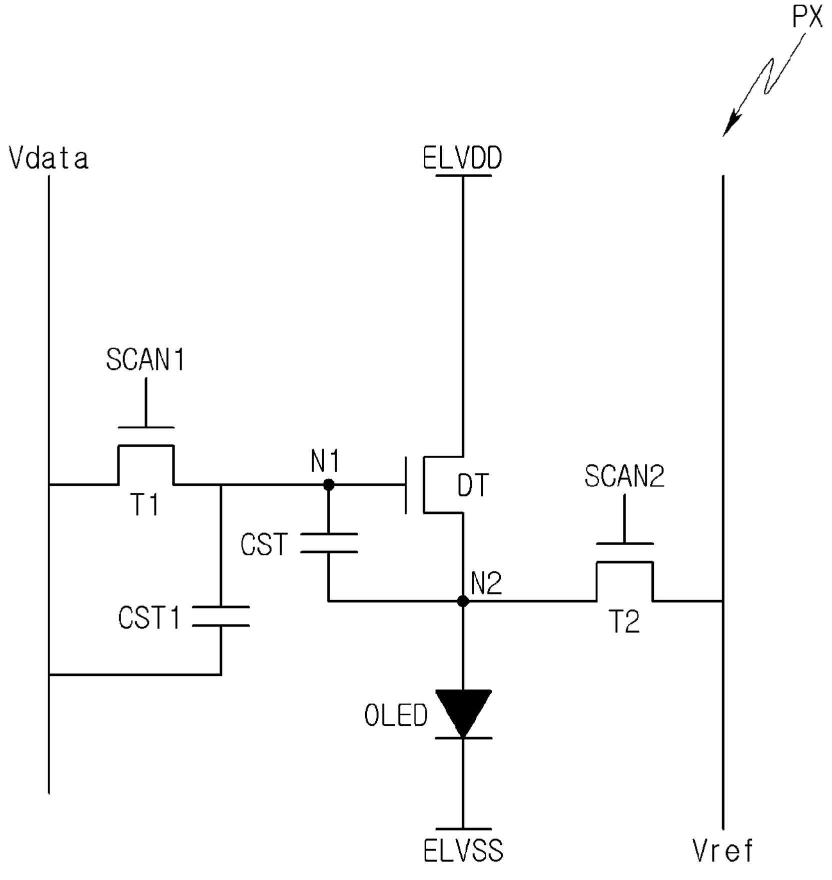
FIG. 18 is a pixel circuit diagram illustrating a pixel circuit of a display device according to yet another embodiment.

Referring to FIGS. 6 and 17, the first frame (1 Frame) may include the first active period ta1 and the first blanking period tb1. During the first active period ta1, the scan transistor T1 of FIG. 18 is turned on and the data voltage Vdata may be input to the first node N1. The video data DATA may be provided to the data driving unit 30 through the video data output unit 15 of the timing control unit 10 during the first active period ta1. The first video data DATA1 may be provided during the first active period ta1.

The data voltage Vdata of the first active period ta1 in FIG. 17 may be a data voltage that has been converted by the data driving unit 30 into analog based on the video data DATA1 converted in the first frame (1 Frame).

Meanwhile, the data voltage Vdata of the first blanking period tb1 may have the voltage level Vdata_g1 that is greater than 0 and less than the first voltage level Vdata1. Since the scan transistor T1 is turned off in the first blanking period tb1, the data voltage Vdata may not be applied to the second node N2. However, since the data voltage Vdata of the first blanking period tb1 has the voltage level Vdata_g1 that is greater than 0 and less than the first voltage level Vdata1, when another frame (2 Frame) starts after the first blanking period tb1, it is possible to prevent in advance a phenomenon where first line pixels PX have a low luminance by the rapid generation of the data voltage Vdata.

Meanwhile, as described above in FIG. 16, in the case of a low-speed display device of which the driving frequency is a low frequency, the refresh interval is long, so that leakage current may occur from the emissive component OLED in the first blanking period tb1, the difference voltage stored in the storage capacitor CST may decrease in the first active period ta1. For example, as shown in FIG. 17, the difference voltage increases (C1→C2) in the first active period ta1. The difference voltage gradually decreases (C2→C3) in the first blanking period tb1. Accordingly, the luminance of the display device also increases (E1→E2) in the first active period ta1, and the luminance of the display device gradually decreases (E2→E3) in the first blanking period tb1.

When the luminance of the display device gradually decreases (E2→E3) in the first blanking period tb1, there may occur a significant gap between the luminance and the luminance E2 in the second active period ta2 of the next second frame (F2). When there is a significant gap in luminance between the first frame (F1) and the second frame (F2), flicker may occur.

Hereinafter, embodiments according to FIGS. 18 to 23 are intended to solve the decrease in luminance, in the first blanking period tb1, of the display device of which the driving frequency is a low frequency.

Figure 19:
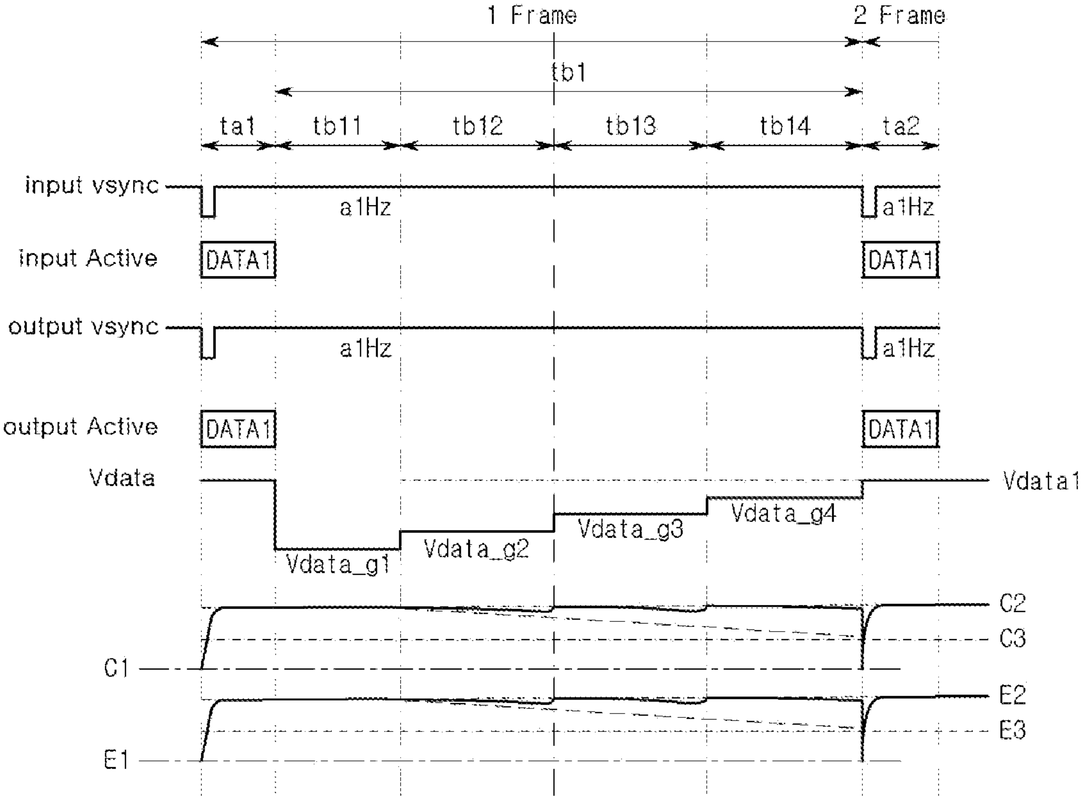
FIG. 19 is a waveform diagram illustrating signals input to the display device according to one embodiment.

FIG. 18 is a pixel circuit diagram illustrating a pixel circuit of a display device according to yet another embodiment. The pixel circuit diagram in the embodiment of FIG. 18 is similar to the pixel circuit diagram in the embodiment of FIG. 2. However, the pixel circuit of FIG. 18 includes a parasitic capacitor CST1 formed between the data line DL and the first node N1. FIG. 19 is a waveform diagram illustrating signals input to the display device according to the embodiment.

Referring to FIGS. 18 and 19, the data voltage Vdata is applied through the data line (see DL in FIG. 1) in the first blanking period tb1. However, in the first blanking period tb1, the scan transistor T1 is turned off, and the data voltage Vdata may not be applied to the first node N1. Since the data voltage Vdata is applied to the data line DL, the parasitic capacitor CST1 may be formed between the data line DL and the first node N1.

As shown in FIG. 19, the first blanking period tb1 may include, for example, four sub-blanking periods tb11 to tb14. That is, the data voltages Vdata having different magnitudes Vdata_g1 to Vdata_g4 may be applied in the sub-blanking periods tb11 to tb14, respectively. In the sub-blanking periods tb1 to tb14, the video data output unit 15 may provide video data corresponding to the data voltages Vdata having different magnitudes Vdata_g1 to Vdata_g4 respectively to the data driving unit 30.

Although FIG. 19 shows that the first blanking period tb1 includes four sub-blanking periods tb11 to tb14, the first blanking period tb1 is not limited thereto. The first blanking period tb1 may include two to three sub-blanking periods, or may include five or more sub-blanking periods. The data voltage Vdata having a greater magnitude may be applied in the sub-blanking periods over time.

For example, the data voltage Vdata having a predetermined voltage level Vdata_g1 may be applied in the first-first sub-blanking period tb11. In the first-first sub-blanking period tb11, the difference voltage and luminance may be maintained at the same level (C2 and E2) as that of the first active period ta1, respectively, and then may be gradually decreased.

The data voltage Vdata having the voltage level Vdata_g2 greater than the voltage level Vdata_g1 may be applied in the first-second sub-blanking period tb12. In the first-second sub-blanking period tb12, the data voltage Vdata having the voltage level Vdata_g2 greater than the voltage level Vdata_g1 is applied, so that the difference voltage and luminance may be maintained at the same level (C2 and E2) as that of the first-first sub-blanking period tb11.

The data voltage Vdata having the voltage level Vdata_g3 greater than the voltage level Vdata_g2 may be applied in the first-third sub-blanking period tb13. In the first-third sub-blanking period tb13, the data voltage Vdata having the voltage level Vdata_g3 greater than the voltage level Vdata_g2 is applied, so that the difference voltage and luminance may be maintained at the same level (C2 and E2) as that of the first-second sub-blanking period tb12.

The data voltage Vdata having the voltage level Vdata_g4 greater than the voltage level Vdata_g3 may be applied in the first-fourth sub-blanking period tb14. In the first-fourth sub-blanking period tb14, the data voltage Vdata having the voltage level Vdata_g4 greater than the voltage level Vdata_g3 is applied, so that the difference voltage and luminance may be maintained at the same level (C2 and E2) as that of the first-third sub-blanking period tb13.

As shown in FIG. 19, in the first blanking period tb1, when only the data voltage Vdata having a predetermined voltage level Vdata_g1 is applied to the data line (see DL in FIG. 1), the difference voltage and luminance of the display device at a time point when switched to the second active period ta2 may be significantly reduced compared to the difference voltage and luminance that have been charged in the first active period ta1, respectively (C2→C3 and E2→E3).

However, according to the embodiment, in the first blanking period tb1, by gradually increasing the voltage level of the data voltage Vdata applied to the data line (see DL in FIG. 1), the difference voltage and luminance of the display device at a time point when switched to the second active period ta2 may be maintained at the same level (C2 and E2) as that of the difference voltage and luminance charged in the first active period (ta1), respectively. Due to this, luminance difference between adjacent frames F1 and F2 can be reduced. Accordingly, the occurrence of flicker between the first frame F1 and the second frame F2 can be improved.

Figure 20:
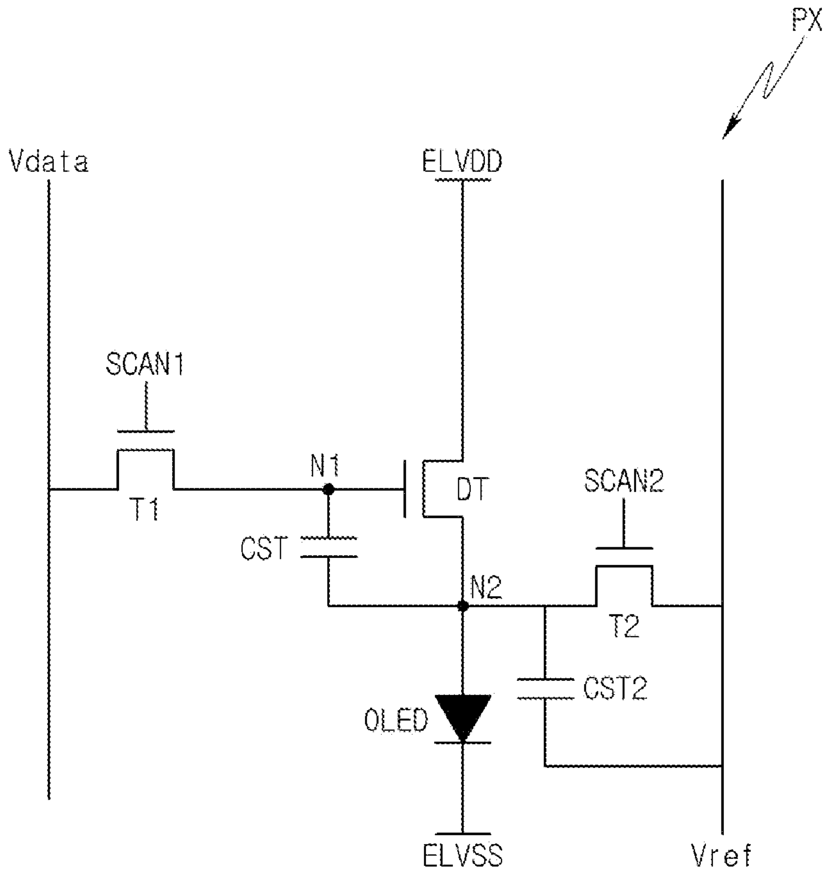
FIG. 20 is a pixel circuit diagram illustrating a pixel circuit of a display device according to still another embodiment.
Figure 21:
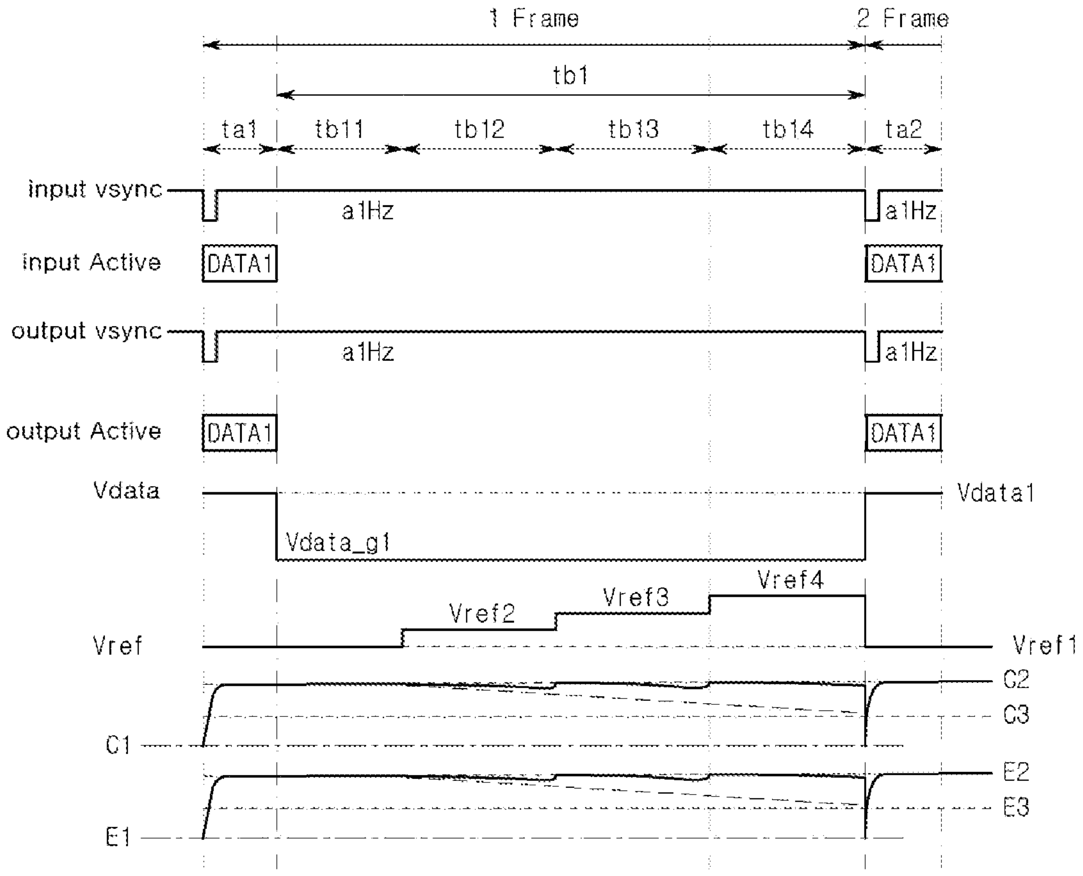
FIG. 21 is a waveform diagram illustrating signals input to the display device according to one embodiment.

FIG. 20 is a pixel circuit diagram illustrating a pixel circuit of a display device according to still another embodiment. The pixel circuit diagram in the embodiment of FIG. 20 is similar to the pixel circuit diagram in the embodiment of FIG. 2. However, the pixel circuit of FIG. 20 includes a parasitic capacitor CST2 formed between the initialization voltage line and the second node N2. FIG. 21 is a waveform diagram illustrating signals input to the display device according to the embodiment.

The embodiment according to FIGS. 20 and 21 is different from the embodiment according to FIGS. 18 and 19 in that it is possible to improve the occurrence of flicker between the first frame F1 and the second frame F2 by using the parasitic capacitor CST2 between the initialization voltage line to which the initialization voltage Vref is applied and the second node N2.

More specifically, since the initialization voltage Vref is applied to the initialization voltage line, the parasitic capacitor CST2 may be formed between the initialization voltage line and the second node N2.

The initialization voltages Vref having different magnitudes Vref1 to Vref4 may be applied in the sub-blanking periods tb11 to tb14, respectively. In the sub-blanking periods tb11 to tb14, the initialization voltage output unit (see reference number 17 in FIG. 14) may provide the initialization voltages Vref having different magnitudes Vref1 to Vref4 to the data driving unit 30.

For example, the initialization voltage Vref having a predetermined voltage level Vref1 may be applied in the first-first sub-blanking period tb11. In the first-first sub-blanking period tb11, the difference voltage and luminance may be maintained at the same level (C2 and E2) as that of the first active period ta1, respectively, and then may be gradually decreased.

The initialization voltage Vref having the voltage level Vref2 greater than the voltage level Vref1 may be applied in the first-second sub-blanking period tb12. In the first-second sub-blanking period tb12, the initialization voltage Vref having the voltage level Vref2 greater than the voltage level Vref1 is applied, so that the difference voltage and luminance may be maintained at the same level (C2 and E2) as that of the first-first sub-blanking period tb11.

The initialization voltage Vref having the voltage level Vref3 greater than the voltage level Vref2 may be applied in the first-third sub-blanking period tb13. In the first-third sub-blanking period tb13, the initialization voltage Vref having the voltage level Vref3 greater than the voltage level Vref2 is applied, so that the difference voltage and luminance may be maintained at the same level (C2 and E2) as that of the first-second sub-blanking period tb12.

The initialization voltage Vref having the voltage level Vref4 greater than the voltage level Vref3 may be applied in the first-fourth sub-blanking period tb14. In the first-fourth sub-blanking period tb14, the initialization voltage Vref having the voltage level Vref4 greater than the voltage level Vref3 is applied, so that the difference voltage and luminance may be maintained at the same level (C2 and E2) as that of the first-third sub-blanking period tb13.

As shown in FIG. 21, in the first blanking period tb1, when only the initialization voltage Vref having a predetermined voltage level Vref1 is applied to the initialization voltage line, the difference voltage and luminance of the display device at a time point when switched to the second active period ta2 may be significantly reduced compared to the difference voltage and luminance that have been charged in the first active period ta1, respectively (C2→C3 and E2→E3).

However, according to the embodiment, in the first blanking period tb1, by gradually increasing the voltage level of the initialization voltage Vref applied to the initialization voltage line, the difference voltage and luminance of the display device at a time point when switched to the second active period ta2 may be maintained at the same level (C2 and E2) as that of the difference voltage and luminance charged in the first active period (ta1), respectively. Due to this, luminance difference between adjacent frames F1 and F2 can be reduced. Accordingly, the occurrence of flicker between the first frame F1 and the second frame F2 can be improved.

Figure 22:
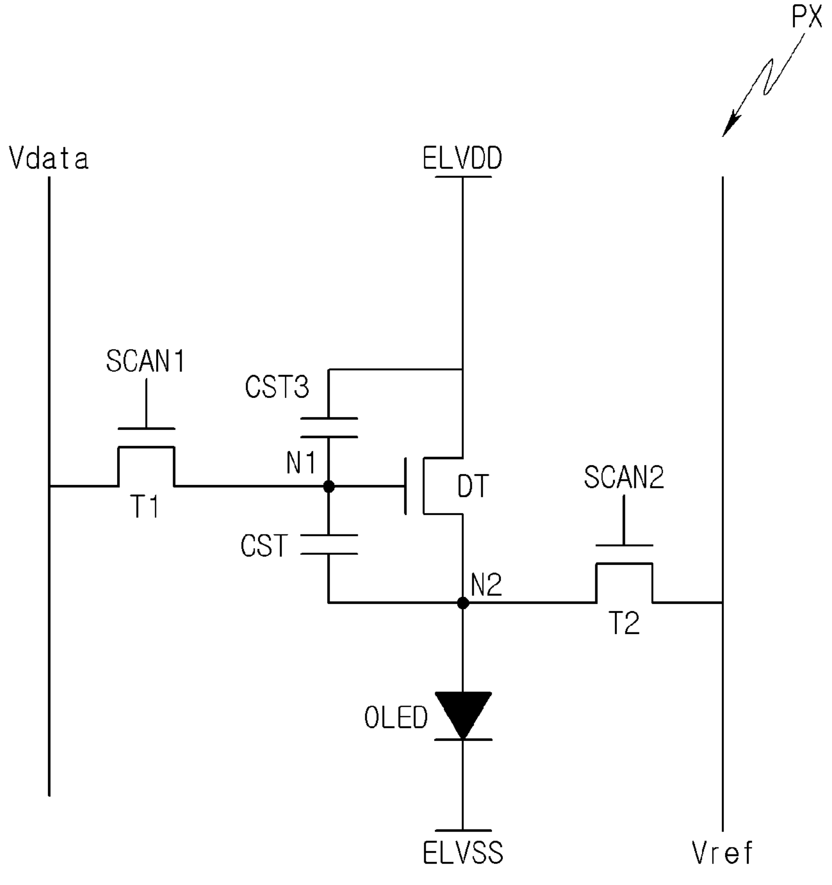
FIG. 22 is a pixel circuit diagram illustrating a pixel circuit of a display device according to still another embodiment.
Figure 23:
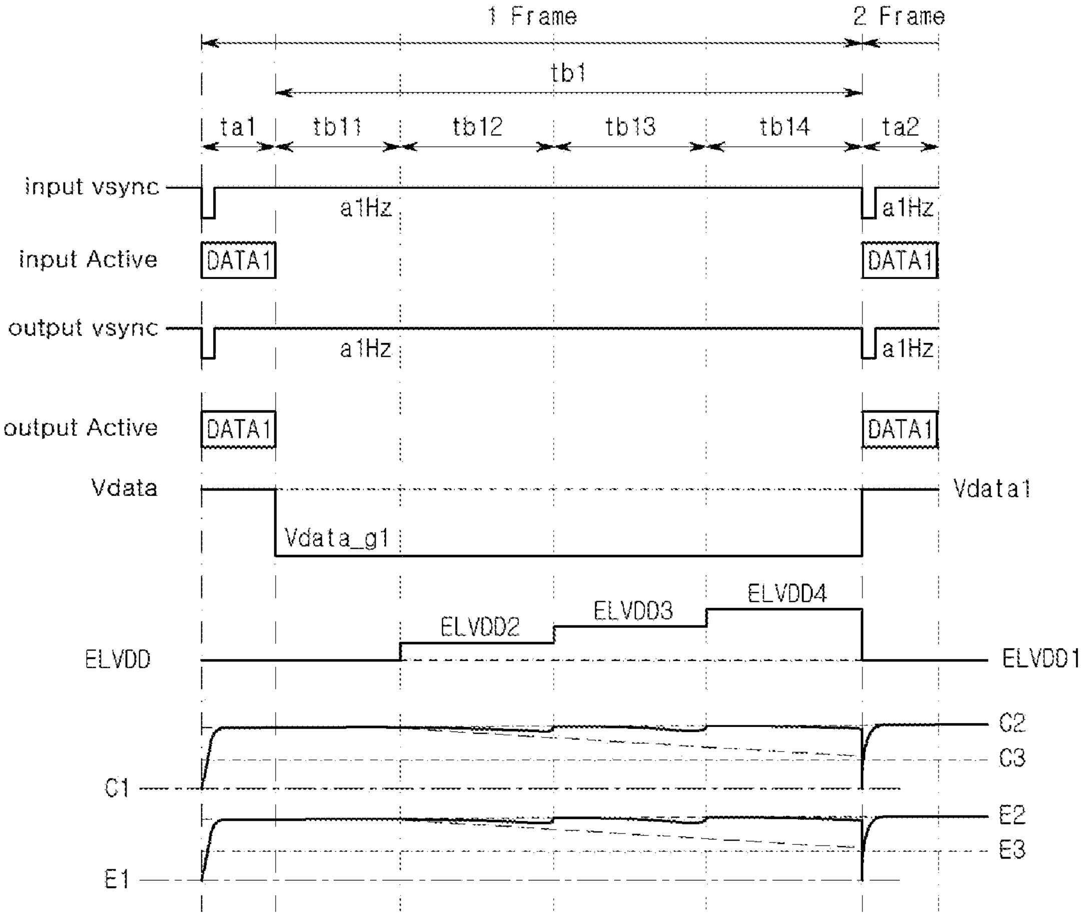
FIG. 23 is a waveform diagram illustrating signals input to the display device according to the embodiment.

FIG. 22 is a pixel circuit diagram illustrating a pixel circuit of a display device according to still another embodiment. The pixel circuit diagram in the embodiment of FIG. 20 is similar to the pixel circuit diagram in the embodiment of FIG. 2. However, the pixel circuit of FIG. 20 includes a parasitic capacitor CST3 formed between the first power line PL1 line and the first node N1. FIG. 23 is a waveform diagram illustrating signals input to the display device according to the embodiment.

Referring to FIGS. 22 and 23, since the high-potential voltage ELVDD is applied to a first power line PL1, the parasitic capacitor CST3 may be formed between the first power line PL1 and the first node N1.

The high-potential voltages ELVDD having different magnitudes ELVDD1 to ELVDD4 may be applied in the sub-blanking periods tb11 to tb14, respectively. A high-potential voltage output unit (not shown) of the timing control unit controls the power supply unit (see FIG. 1) and then may provide the high-potential voltages ELVDD having different magnitudes ELVDD1 to ELVDD4 to the first power line PL1 in the first sub-blanking periods tb11 to tb14.

For example, the high-potential voltage ELVDD having a predetermined voltage level ELVDD may be applied in the first-first sub-blanking period tb11. In the first-first sub-blanking period tb11, the difference voltage and luminance may be maintained at the same level (C2 and E2) as that of the first active period ta1, respectively, and then may be gradually decreased.

The high-potential voltage ELVDD having the voltage level ELVDD2 greater than the voltage level ELVDD1 may be applied in the first-second sub-blanking period tb12. In the first-second sub-blanking period tb12, the high-potential voltage ELVDD having the voltage level ELVDD2 greater than the voltage level ELVDD1 is applied, so that the difference voltage and luminance may be maintained at the same level (C2 and E2) as that of the first-first sub-blanking period tb11.

The high-potential voltage ELVDD having the voltage level ELVDD3 greater than the voltage level ELVDD2 may be applied in the first-third sub-blanking period tb13. In the first-third sub-blanking period tb13, the high-potential voltage ELVDD having the voltage level ELVDD3 greater than the voltage level ELVDD2 is applied, so that the difference voltage and luminance may be maintained at the same level (C2 and E2) as that of the first-second sub-blanking period tb12.

The high-potential voltage ELVDD having the voltage level ELVDD4 greater than the voltage level ELVDD3 may be applied in the first-fourth sub-blanking period tb14. In the first-fourth sub-blanking period tb14, the high-potential voltage ELVDD having the voltage level ELVDD4 greater than the voltage level ELVDD3 is applied, so that the difference voltage and luminance may be maintained at the same level (C2 and E2) as that of the first-third sub-blanking period tb13.

As shown in FIG. 23, in the first blanking period tb1, when only the high-potential voltage ELVDD having a predetermined voltage level ELVDD1 is applied to the initialization voltage line, the difference voltage and luminance of the display device at a time point when switched to the second active period ta2 may be significantly reduced compared to the difference voltage and luminance that have been charged in the first active period ta1, respectively (C2→C3 and E2→E3).

However, according to the embodiment, in the first blanking period tb1, by gradually increasing the voltage level of the high-potential voltage ELVDD applied to the first power line PL1, the difference voltage and luminance of the display device at a time point when switched to the second active period ta2 may be maintained at the same level (C2 and E2) as that of the difference voltage and luminance charged in the first active period (ta1), respectively. Due to this, luminance difference between adjacent frames F1 and F2 can be reduced. Accordingly, the occurrence of flicker between the first frame F1 and the second frame F2 can be improved.

The display device according to the embodiment includes: a first frame including a first active period and a first blanking period; and a pixel including: an emissive component; a driving transistor including a first electrode to which a high potential voltage is applied, a second electrode connected to an anode electrode of the emissive component, and a gate electrode connected to a first node; a scan transistor including a first electrode to which a data voltage is applied through a data line, a second electrode connected to the first node, and a gate electrode to which a first scan signal is applied; a storage capacitor that is between the first node and the anode electrode; and a parasitic capacitor that is formed at one end or the other end of the storage capacitor. In the first blanking period, the difference voltage of the storage capacitor charged in the first active period is maintained by using the parasitic capacitor.

The parasitic capacitor may be formed between the data line and the first node.

In the first blanking period, the voltage level of the data voltage may increase.

The pixel may further include an initialization transistor that includes a first electrode to which an initialization voltage is applied through an initialization voltage line, a second electrode connected to the anode electrode, and a gate electrode to which a second scan signal is applied. The parasitic capacitor may be formed between the initialization voltage line and the second node.

In the first blanking period, a voltage level of the initialization voltage may increase.

The parasitic capacitor may be formed between a first power line to which the high potential voltage is applied and the first node.

In the first blanking period, a voltage level of the high potential voltage may increase.

In the first blanking period, leakage current may be generated from the light emitting device.

The advantages of this specification are not limited to the aforesaid, and other advantages not described herein may be clearly understood by those skilled in the art from the descriptions below.

Although embodiments of this invention have been described above with reference to the accompanying drawings, it will be understood that the technical configuration of this invention described above can be implemented in other specific forms by those skilled in the art without changing the technical concept or essential features of the present invention. Therefore, it should be understood that the embodiments described above are exemplary and not limited in all respects. Furthermore, the scope of the present invention is defined by the claims set forth below, rather than the detailed description above. In addition, it should be understood that all modifications or variations derived from the meaning and scope of the claims and their equivalent concept are included within the scope of the this invention.

DESCRIPTION OF REFERENCE NUMERALS

1: display device
10: timing control unit
20: gate driving unit
30: data driving unit
40: emission driving unit
50: power supply unit
60: display panel

What is claimed is:

1. A display device comprising:

a display panel including a plurality of pixels, the plurality of pixels driven during a first frame with a first driving frequency and driven during a second frame with a second driving frequency;

a frequency generation circuit configured to generate first frequency information indicative of the first driving frequency of the first frame after an end of the first frame;

a gain generation circuit configured to receive the first frequency information indicative of the first driving frequency generated by the frequency generation circuit and generate a first gain value for the second frame based on the first driving frequency of the first frame indicated in the received first frequency information; and a video data output circuit configured to output video data generated based on the first gain value to a data driving circuit during the second frame, wherein the display panel displays an image based on the outputted video data during the second frame.

2. The display device of claim 1, wherein the plurality of pixels are driven during a third frame with a third driving frequency after the second frame, and the frequency generation circuit generates second frequency information indicative of the second driving frequency after an end of the second frame, the gain generation circuit generates a second gain value for the third frame based on the second driving frequency indicated in the second frequency information, wherein the first driving frequency is equal to the second driving frequency and the third driving frequency is less than the first driving frequency and the second driving frequency, and the first gain value and the second gain value are equal.

3. The display device of claim 2, wherein the plurality of pixels are driven during a fourth frame with a fourth driving frequency after the third frame, and the frequency generation circuit generates third frequency information indicative of the third driving frequency after an end of the third frame, the gain generation circuit generates a third gain value for the fourth frame based on the third driving frequency indicated in the third frequency information, wherein the third gain value is less than the first gain value and the second gain value.

4. The display device of claim 1, wherein the first frame comprises a first active period and a first blank period and the second frame comprises a second active period and a second blank period, wherein the video data output circuit outputs the video data generated based on the first gain value to the data driving circuit during the second active period, and the data driving circuit outputs a data voltage at a first voltage level to a pixel from the plurality of pixels based on the video data generated based on the first gain value during the second active period.

5. The display device of claim 4, wherein the data driving circuit outputs to the pixel the data voltage at a second voltage level that is less than the first voltage level during the second blank period.

6. The display device of claim 5, wherein the data voltage is maintained at the second voltage level during a portion of the second blank period.

7. The display device of claim 5, wherein the pixel comprises an emissive component, a driving transistor connected to the emissive component, and a scan transistor connected to the driving transistor, wherein the driving transistor comprises a first electrode of the driving transistor applied with a high-potential voltage, a second electrode of the driving transistor connected to an anode electrode of the emissive component, and a gate electrode of the driving transistor connected to a first node, and the scan transistor comprises a first electrode of the scan transistor applied with the data voltage, a second node connected to the first node, and a gate electrode of the scan transistor applied with a first scan signal.

8. The display device of claim 7, wherein the pixel further comprises:

a parasitic capacitor between the first node and a data line applied with the data voltage.

9. The display device of claim 8, wherein the frequency generation circuit counts a duration of the second blank period after an end of the second active period.

10. The display device of claim 9, wherein the video data output circuit decreases the second voltage level a plurality of times in a stepwise manner based on the counted duration of the second blank period.

11. The display device of claim 7, wherein the pixel further comprises:

an initialization transistor comprising a first electrode applied with an initialization voltage, a second electrode connected to the anode electrode, and a gate electrode applied with a second scan signal.

12. The display device of claim 11, wherein the pixel further comprises:

a parasitic capacitor formed between the anode electrode and an initialization voltage line that applies the initialization voltage.

13. The display device of claim 12, wherein the frequency generation circuit counts a duration of the second blank period after an end of the second active period.

14. The display device of claim 13, wherein the initialization voltage is decreased a plurality of times in a stepwise manner during the second blank period based on the counted duration of the second blank period.

15. A display device comprising:

a display panel including a plurality of pixels, a plurality of data lines, and a plurality of gate lines that intersect the plurality of data lines, the plurality of pixels driven during a first frame with a first driving frequency and the plurality of pixels driven during a second frame with a second driving frequency;

a timing controller configured to generate a first gain value for the second frame based on the first driving frequency of the first frame and output first video data that is generated based on the first gain value during the second frame;

a data driver configured to convert the first video data generated based on the first gain value into first data signals that are transmitted to the plurality of data lines during the second frame; and a gate driver configured to output gate signals to the plurality of data lines during the first frame and the second frame, wherein the display panel displays an image based on the first data signals during the second frame.

16. The display device of claim 15, wherein the first driving frequency and the second driving frequency are equal and the plurality of pixels are driven during a third frame with a third driving frequency that is less than the first driving frequency and the second driving frequency after the second frame, and the timing controller is configured to generate a second gain value for the third frame based on the second driving frequency and output second video data that is generated based on the second gain value during the third frame, the second gain value equal to the first gain value.

17. The display device of claim 15, wherein the first frame comprises a first active period and a first blank period and the second frame comprises a second active period and a second blank period, wherein the timing controller outputs the first video data generated based on the first gain value to the data driver during the second active period, and the data driver outputs a first data signal from the first data signals at a first voltage level during the second active period to a pixel from the plurality of pixels based on the first video data generated based on the first gain value, and outputs other first data signals from the first data signals at second voltage levels that are less than the first voltage level during the second blank period.

18. The display device of claim 17, wherein the second blank period is longer than the first blank period and includes a first blank portion and a second blank portion, a duration of time of the first blank portion and a duration of time of the second blank portion equal to the first blank period, wherein a second voltage level of a first data signal from the other first data signals output during the first blank portion is less than the first voltage level of the first data signal output during the second active period, and a second voltage level of another first data signal from the other first data signals that is output during the second blank portion is less than the second voltage level of the first data signal output during the first blank portion.

19. The display device of claim 15, wherein each of the plurality of pixels comprises:

a driving transistor including a gate electrode of the driving transistor that is connected to a first node, a first electrode of the driving transistor that is applied with a high-potential voltage, and a second electrode of the driving transistor that is connected to a second node;

an emissive component configured to emit light, the emissive component including an anode electrode connected to the second electrode of the driving transistor at the second node;

a scan transistor including a first electrode of the scan transistor that is connected to a data line from the plurality of data lines, a second electrode of the scan transistor that is connected to the gate electrode of the driving transistor at the first node, and a gate electrode applied with a first gate signal; and an initialization transistor comprising a first electrode of the initialization transistor that is applied with an initialization voltage, a second electrode of the initialization transistor that is connected to the second electrode of the driving transistor at the second node, and a gate electrode of the initialization transistor that is applied a second gate signal.

20. The display device of claim 19, wherein the first frame comprises a first active period and a first blank period and the second frame comprises a second active period and a second blank period, wherein during the second active period the initialization voltage applied to the second electrode of the driving transistor by the initialization transistor is at a first initialization voltage level and during the second blank period the initialization voltage applied to the second electrode of the driving transistor by the initialization transistor is at second initialization voltage levels that are less than the first initialization voltage level.

21. The display device of claim 20, wherein the second blank period is longer than the first blank period and the second blank period includes a first blank portion and a second blank portion, a duration of time of the first blank portion and a duration of time of the second blank portion are equal to the first blank period, wherein a second initialization voltage level of the initialization voltage during the first blank portion is less than the first initialization voltage level of the initialization voltage during the second active period, and a second initialization voltage level of the initialization voltage during the second blank portion is less than the second initialization voltage level of the initialization voltage during the first blank portion.

* * * * *